United States Patent
Mori

(10) Patent No.: US 12,472,632 B2
(45) Date of Patent: Nov. 18, 2025

(54) OPERATION SYSTEM, OPERATION METHOD, AND STORAGE MEDIUM

(71) Applicant: TOYOTA JIDOSHA KABUSHIKI KAISHA, Toyota (JP)

(72) Inventor: Takemitsu Mori, Toyota (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 311 days.

(21) Appl. No.: 18/134,728

(22) Filed: Apr. 14, 2023

(65) Prior Publication Data

US 2023/0415346 A1    Dec. 28, 2023

(30) Foreign Application Priority Data

Jun. 28, 2022 (JP) .................. 2022-103188

(51) Int. Cl.
*B25J 9/16* (2006.01)
*G06F 3/04817* (2022.01)

(52) U.S. Cl.
CPC ........... *B25J 9/1689* (2013.01); *B25J 9/1682* (2013.01); *G06F 3/04817* (2013.01)

(58) Field of Classification Search
CPC .... B25J 9/1689; B25J 9/1682; G06F 3/04817
USPC ................................................. 700/245–264
See application file for complete search history.

(56) References Cited

U.S. PATENT DOCUMENTS

| | | | |
|---|---|---|---|
| 2017/0225336 A1* | 8/2017 | Deyle | B25J 11/008 |
| 2018/0246514 A1 | 8/2018 | Mitomo et al. | |
| 2019/0224852 A1* | 7/2019 | Choi | B25J 11/00 |
| 2020/0045222 A1 | 2/2020 | Franzius | |
| 2021/0053229 A1* | 2/2021 | Yuan | B25J 13/00 |
| 2023/0073325 A1* | 3/2023 | Sasaki | G05D 1/0038 |

FOREIGN PATENT DOCUMENTS

| | | |
|---|---|---|
| JP | 6614607 B2 | 12/2019 |
| JP | 2020-039117 A | 3/2020 |
| JP | 2021-150931 A | 9/2021 |
| WO | 2017029982 A1 | 2/2017 |
| WO | WO-2022055117 A1 * | 3/2022 |

OTHER PUBLICATIONS

"How to Change the Player Order on the Nintendo Wii." Youtube, uploaded by Tutorials Under a Minute, May 24, 2018, https://www.youtube.com/watch?v=du_Rs1wKA_w (Year: 2018).*

* cited by examiner

*Primary Examiner* — Jason Holloway
*Assistant Examiner* — Alexandra R. Morford
(74) *Attorney, Agent, or Firm* — Oliff PLC

(57) ABSTRACT

The operation system controls a moving object selected from a plurality of moving objects. The operation system includes a display unit that displays display information including an image of the surroundings of the moving body, and a switching unit that switches the control target from the first moving body to the second moving body by using the operation information indicating the operation of the moving body. The switching unit switches the control target from the first moving body to the second moving body in at least one of a case where the second moving body starts the operation based on the operation information of the first moving body, a case where the first moving body starts the operation based on the operation information of the second moving body, and a case where the display unit displays an image adjusted in accordance with the operation information of the first moving body.

5 Claims, 18 Drawing Sheets

OPERATION SYSTEM, OPERATION METHOD, AND STORAGE MEDIUM

CROSS-REFERENCE TO RELATED APPLICATION

This application claims priority to Japanese Patent Application No. 2022-103188 filed on Jun. 28, 2022, incorporated herein by reference in its entirety.

BACKGROUND

1. Technical Field

The present disclosure relates to an operation system, an operation method, and a storage medium.

2. Description of Related Art

A technique is known in which an operator remotely operates a moving object such as an autonomously moving robot via an operation terminal. As a related art, for example, Japanese Patent No. 6614607 (JP 6614607 B) discloses a remote operation system capable of appropriately confirming a road surface condition at a distance while concentrating on remote operation of a traveling moving object.

SUMMARY

Assume that an operator remotely operates a plurality of robots via an operation terminal using a system as disclosed in JP 6614607 B. The operation terminal displays an image captured by a camera of the robot currently operated by the operator. The operation terminal also displays a plurality of operating robots on a screen, and accepts a selection of a robot of an operation target from the operator.

As the display screen, for example, a list format in which the robots are displayed in a list, a map format in which current positions of the robots are superimposed on a map, or the like can be used. The operator selects a robot to be operated from a plurality of operating robots and makes a switching request. The operation terminal accepts the switching request and switches the robot of the operation target.

In such a case, the operation terminal transmits an instruction signal to the robot of the switching source, and stops the operation of the remote robot currently being operated. It is necessary for the operation terminal to temporarily terminate the video from the robot of the switching source, which is displayed on the screen, to transition the screen to the robot selection screen, and to allow the operator to select another robot. Here, when there is a deviation in movement or speed between the robot of the switching source and the robot of the switching destination, the switching of the operation target may cause the remote controller to feel uncomfortable. In such a case, each time the robot of the operation target is switched, a feeling of movement by the robot being operated is interrupted, and thus there is a problem that the operator cannot feel a continuous movement experience.

In view of the above problem, an object of the present disclosure is to provide an operation system, an operation method, and a storage medium capable of reducing an uncomfortable feeling that occurs to an operator when switching a moving object of an operation target.

An operation system according to the present disclosure is an operation system for operating a moving object that is an operation target selected from a plurality of moving objects, and includes: a display unit for displaying display information including a video obtained by imaging a periphery of the moving object; and a switching unit for switching the operation target from a first moving object that is a switching source to a second moving object that is a switching destination, using movement information indicating movement of the moving object. The switching unit switches the operation target from the first moving object to the second moving object in at least one of following cases:
 i) after the second moving object starts moving based on movement information of the first moving object,
 ii) after the first moving object starts moving based on movement information of the second moving object, and
 iii) after the display unit displays a video adjusted in accordance with the movement information of the first moving object.

An operation method according to the present disclosure executes: a displaying step for displaying display information including a video obtained by imaging a periphery of a moving object, by a computer of the operation system for operating the moving object of an operation target selected from a plurality of moving objects; and a switching step for switching the operation target from a first moving object that is a switching source to a second moving object that is a switching destination, using movement information indicating movement of the moving object by the computer. The switching step includes switching the operation target from the first moving object to the second moving object in at least one of following cases:
 i) after the second moving object starts moving based on movement information of the first moving object,
 ii) after the first moving object starts moving based on movement information of the second moving object, and
 iii) after a video adjusted in accordance with the movement information of the first moving object is displayed in the displaying step.

In a storage medium according to the present disclosure, a program causes a computer of an operation system for operating a moving object that is an operation target selected from a plurality of moving objects to execute steps including: a displaying step for displaying display information including a video obtained by imaging a periphery of the moving object; and a switching step for switching the operation target from a first moving object that is a switching source to a second moving object that is a switching destination, using movement information indicating movement of the moving object. The switching step includes switching the operation target from the first moving object to the second moving object in at least one of following cases:
 i) after the second moving object starts moving based on movement information of the first moving object,
 ii) after the first moving object starts moving based on movement information of the second moving object, and
 iii) after a video adjusted in accordance with the movement information of the first moving object is displayed in the displaying step.

The operation system, the operation method, and the storage medium according to the present disclosure can reduce an uncomfortable feeling that occurs to an operator when switching a moving object of an operation target.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 18 is a block diagram illustrating a hardware configuration of a computer that implements a control device or the like.

DETAILED DESCRIPTION OF EMBODIMENTS

Figure 1:
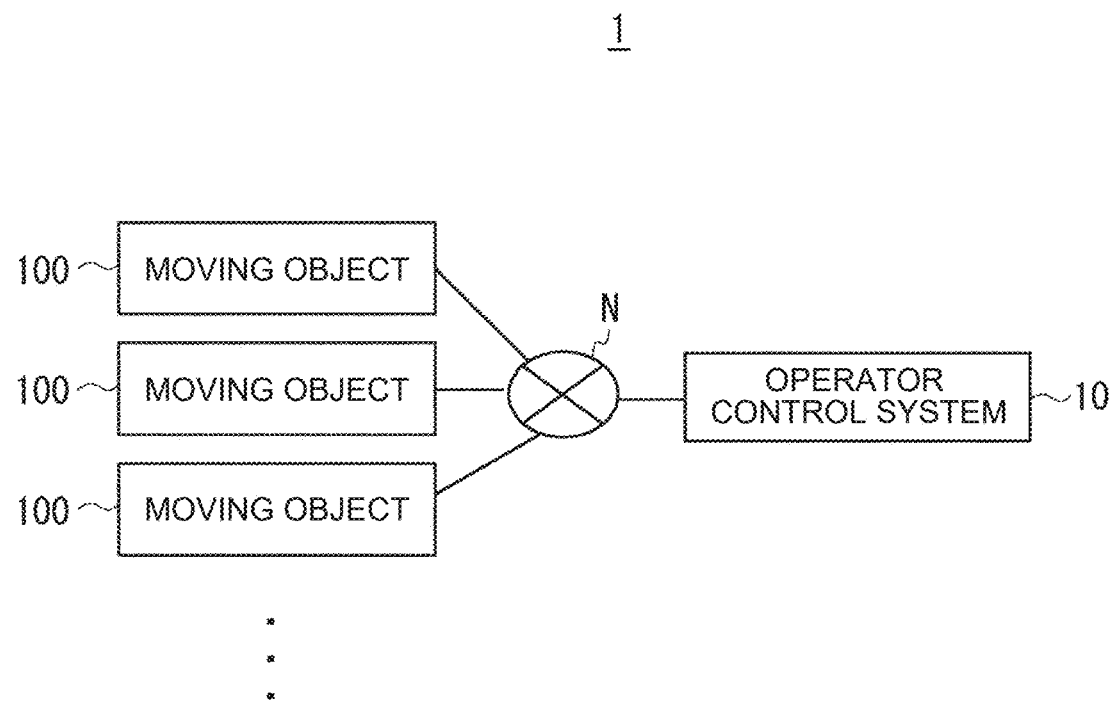
FIG. 1 is a block diagram illustrating a configuration of an operation system according to a first embodiment.

Hereinafter, embodiments of the present disclosure will be described in detail with reference to the drawings. In the drawings, the same or corresponding elements are denoted by the same reference numerals. For the sake of clarity of the description, duplicate descriptions are omitted as necessary.

Embodiment 1

Configuration of Operation System 1

A first embodiment will be described with reference to FIG. 1. FIG. 1 is a block diagram illustrating a configuration of an operation system 1 according to the present embodiment. As illustrated in FIG. 1, the operation system 1 includes a plurality of moving objects 100 and an operator control system 10 for controlling the plurality of moving objects 100. Although three moving objects 100 are illustrated in the figure, the number of moving objects 100 is not limited thereto.

The operation system 1 according to the present embodiment is an information processing system that enables an operator to remotely control a plurality of moving objects 100 using the operator control system 10. The operator control system 10 controls the plurality of moving objects 100. Further, the operator control system 10 receives, from the operator, a selection of a moving object to be operated among the plurality of moving objects 100.

The plurality of moving objects 100 and the operator control system 10 are connected via a network N. The network N is, for example, a wired or wireless communication line. Although an example in which one operator control system 10 is connected to a plurality of moving bodies 100 is illustrated here, a plurality of control devices 10 may be provided.

Figure 2:
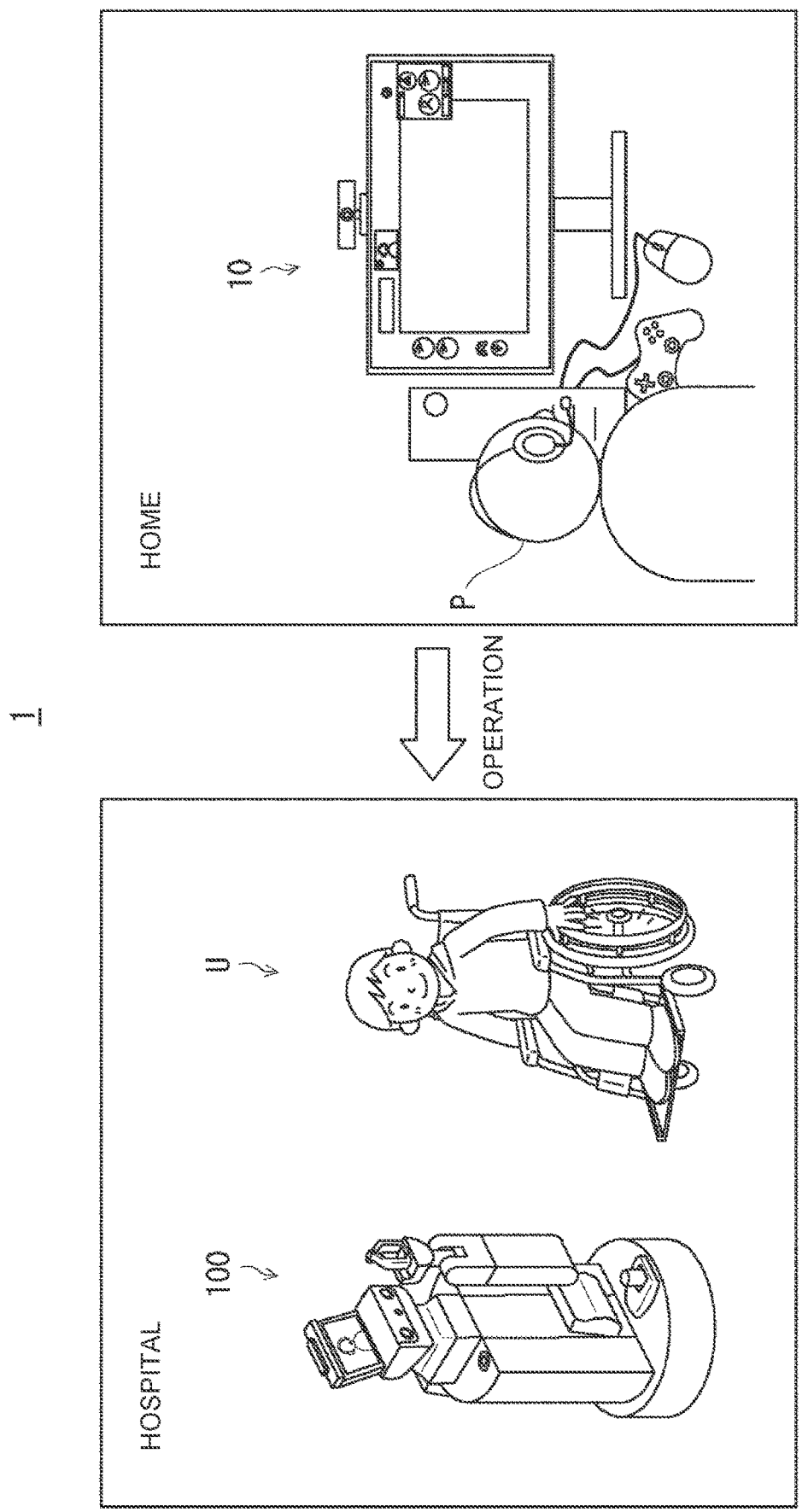
FIG. 2 is a diagram illustrating an example of use of the operation system according to the first embodiment.

FIG. 2 is a diagram illustrating an example of use of the operation system 1 according to the present embodiment. The moving object 100 is, for example, a moving robot capable of autonomously moving in an environment. The environment may be any space or the like in which the moving object 100 can move. The environment may include, for example, a residence, a public facility, an office, a store, a hospital, or the like. The environment may be indoors or outdoors.

The moving object 100 includes moving means for moving in the environment. Moving means may include, for example, a drive mechanism for moving over the surface, air, water, or water. The moving object 100 is not limited to the above-described moving robot, and may be, for example, an autonomous vehicle, a drone, or the like.

As illustrated in FIG. 2, the operator P and the moving object 100 are located at different locations. For example, the operator P is at home and the moving object 100 is located in a hospital. In the example shown in the figure, the user U of the wheelchair is supported by the moving object 100 in the hospital. The operator P operates the operator control system 10 at home or the like to control the moving object 100. The positions of the operator P, the user U, and the moving object 100 are not limited thereto, and may be any position.

Configuration of Moving Object 100

Figure 3:
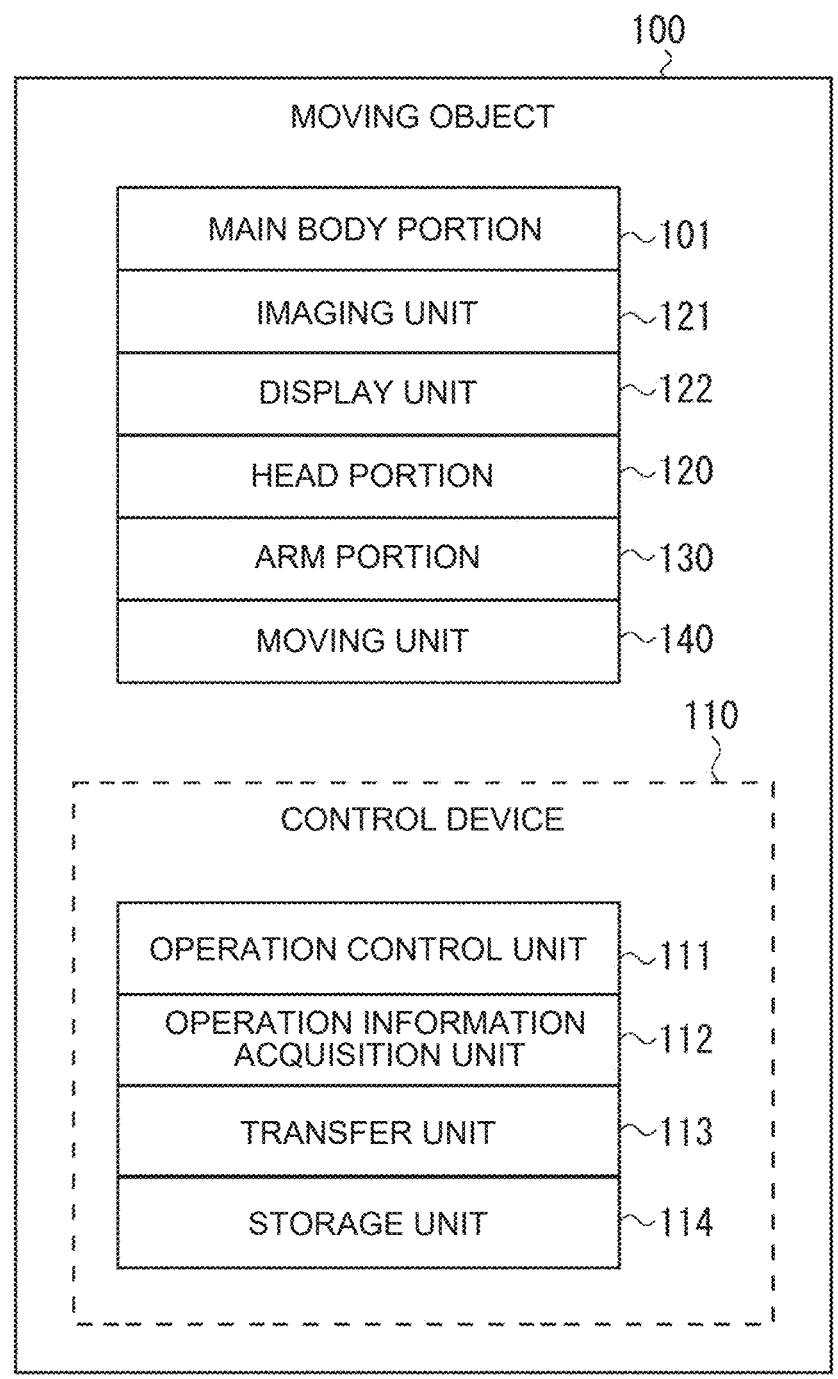
FIG. 3 is a block diagram illustrating a configuration of a moving body according to the first embodiment.
Figure 4:
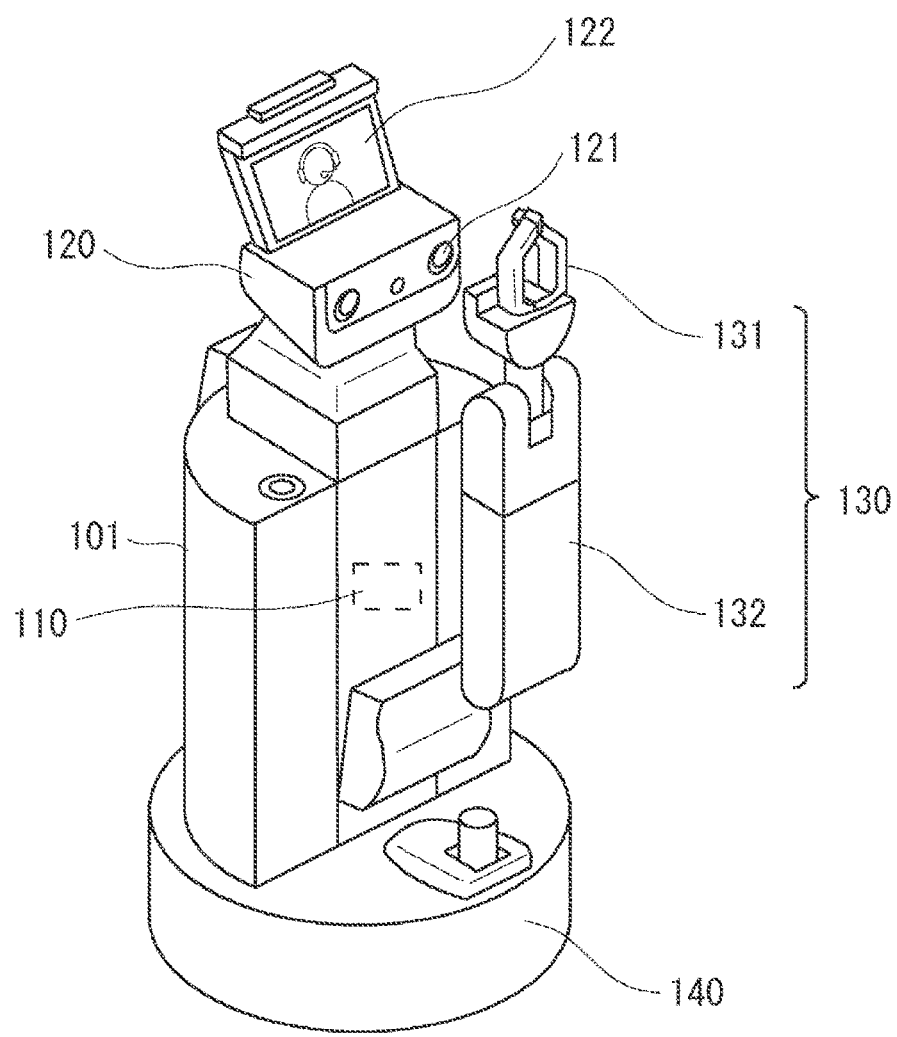
FIG. 4 is a diagram illustrating an example of an external appearance of a moving body according to the first embodiment.

Next, the configuration of the moving object 100 according to the present embodiment will be described with reference to FIGS. 3 and 4. FIG. 3 is a block diagram illustrating a configuration of the moving object 100. FIG. 4 is a diagram illustrating an example of an external appearance of the moving object 100. As illustrated in FIGS. 3 and 4, the moving object 100 includes a main body portion 101, an imaging unit 121, a display unit 122, a head portion 120, an arm portion 130, a moving unit 140, and a robot control device 110.

The main body portion 101 is a body portion of the moving object 100. The main body portion 101 is connected to the head portion 120, the arm portion 130, and the moving unit 140. The main body portion 101 incorporates a robot control device 110. The main body portion 101 may include an expansion and contraction mechanism for expanding and contracting in the vertical direction. Further, the main body portion 101 may include a rotation mechanism for rotating about the axis of the main body portion 101.

The imaging unit 121 is an image capturing device that captures an image around the moving object 100 and acquires an image. The imaging unit 121 captures an image in the environment from a predetermined direction, and outputs an image obtained by the image capturing to the robot control device 110. The predetermined direction is, for example, a direction in which the head portion 120 provided with the imaging unit 121 faces, but is not limited thereto.

The imaging unit 121 is, for example, a two-dimensional camera. The imaging unit 121 may include a three-dimensional camera. The imaging unit 121 may be, for example, a camera (RGB-D camera, stereo camera), a laser range finder, an ultrasonic sensor, a three-dimensional range sensor, or the like.

As illustrated in FIG. 4, the imaging unit 121 is provided on the head portion 120 of the moving object 100 or the like, but is not limited thereto. In addition, a plurality of imaging units 121 may be provided in the moving object 100.

The display unit 122 is a display device that displays an image. For example, the display unit 122 displays an image acquired from the operator control system 10. The image may be an image or the like acquired by the imaging unit 50 of the operator control system 10. In the example illustrated in FIG. 4, the display unit 122 displays a face image of the operator P. The display unit 122 may display not only a video but also a still image, characters, and the like. Further, the display unit 122 may display an image or the like captured by the imaging unit 121, or may display information stored in the storage unit 114.

The display unit 122 may include, for example, a liquid crystal display, an organic EL display, or the like. The display unit 122 may be a touch panel having a function of an input unit that accepts an input when a user touches it with a finger or the like.

The head portion 120 is provided at an upper portion of the main body portion 101 of the moving object 100. The head portion 120 includes an imaging unit 121 and a display unit 122. The head portion 120 may be provided to be extendable and retractable in the vertical direction by being provided with an extendable mechanism (not shown). As a result, the imaging unit 121 can perform imaging at different heights. Note that the head portion 120 may be provided with an expansion/contraction mechanism for enabling expansion/contraction in the vertical direction. In addition, the head portion 120 may include a rotation mechanism for rotating about the axis of the head portion 120. As a result, the imaging unit 121 can perform imaging in a wider imaging range.

The arm portion 130 includes an arm 132 supported by the main body portion 101 and a hand 131 provided at a distal end of the arm 132. The arm 132 is configured as, for example, an articulated arm. The arm 132 is provided on the front surface of the main body portion 101, but is not limited thereto, and may be provided on a side surface of the main body portion 101 or the like. The arm 132 changes the position and orientation of the arm 132 by operating a drive mechanism (not shown) including a motor or the like in accordance with a control signal from the robot control device 110. The arm 132 may include a telescopic mechanism, and may be configured to change the length of the arm 132.

The hand 131 grips an article or the like in accordance with a control signal from the robot control device 110. The hand 131 changes the position and orientation of the hand 131 by an operation of a drive mechanism (not shown) including a motor or the like. Hand 131 may be, for example, a two-finger hand with a pair of gripping members, such as two human fingers, as shown in FIG. 4, or may be a three-finger hand, or a multi-finger hand with more fingers. Without being limited thereto, various hand effectors may be used as the hand 131.

The moving unit 140 is a moving device that moves the moving object 100 within an environment in which the moving object 100 is present. The moving unit 140 moves the moving object 100 in accordance with a control signal from the robot control device 110. Further, the moving unit 140 moves the moving object 100 in accordance with a switching control signal from the operator control system 10. The switching control signal may include operation information of another moving object 100 that is a switching source.

Here, the operation information is information related to the operation of the moving object 100. The operation information may include, for example, information related to movement of the moving object 100. The motion information may include, for example, parameters such as speed, acceleration, jerk, direction of movement, or vibration of the vehicle 100. The motion information may include a pitch angle, a roll angle, a yaw angle, or the like of the moving object 100 according to the configuration or the moving form of the moving object 100. The moving object 100 includes sensors capable of detecting these pieces of motion information, and thus can acquire various pieces of motion information as described above.

The operation information may be information related to an operation of each functional unit included in the moving object 100. For example, the motion information may be the position of the imaging unit 121, the posture of the imaging unit 121, or the like. The posture of the imaging unit 121 is, for example, the inclination of the camera with respect to the horizontal plane.

The moving unit 140 includes, for example, a pair of two opposing drive wheels and two driven wheels rotatable in the left-right direction. As a result, the moving object 100 is configured to be movable in all directions. The moving unit 140 rotationally drives the respective drive wheels, thereby allowing the moving object 100 to travel in an arbitrary manner, such as forward/backward, left/right turning, acceleration/deceleration, and stop. The moving unit 140 realizes the movement of the moving object 100 by, for example, operating a drive mechanism (not shown) including a motor or the like based on a control signal from the robot control device 110.

In the present embodiment, a moving robot in which the moving object 100 travels on the ground is used, but in a case where the moving object 100 moves according to another movement mode, a drive mechanism suitable for the movement mode may be provided.

The robot control device 110 includes an operation control unit 111, an operation information acquisition unit 112, a transfer unit 113, and a storage unit 114.

The operation control unit 111 controls the operation of each of the functional units described above. That is, the operation control unit 111 controls the operations of the main body portion 101, the imaging unit 121, the display unit 122, the head portion 120, the arm portion 130, and the moving unit 140.

The operation information acquisition unit 112 acquires operation information related to the operation of the moving object 100. As described above, the motion information may include, for example, a speed, an acceleration, a jerk, a moving direction, a vibration, a position of the imaging unit 121, an attitude of the imaging unit 121, and the like of the moving object 100. The operation information acquisition unit 112 acquires motion information by acquiring a detection value from a sensor capable of detecting the motion information. The operation information acquisition unit 112 may acquire motion information from a sensor other than the sensor provided in the moving object 100. For example, the operation information acquisition unit 112 may acquire an image captured by a high-precision infrastructure camera (such as a surveillance camera), an image captured by an artificial satellite, or sensor information such as a mobile terminal brought into the moving object 100, and acquire operation information. The operation information acquisition unit 112 may acquire motion information using a well-known image recognition technique or the like. The operation information acquisition unit 112 is not limited to the inside of the moving object 100, and may be provided outside the moving object 100.

The transfer unit 113 transfers the video captured by the imaging unit 121 and the operation information acquired by the operation information acquisition unit 112 to the operator control system 10. The transfer unit 113 may transfer the video and the operation information stored in the storage unit 114. The transfer unit 113 may be configured to include, for example, a communication interface with the network N. The transfer unit 113 transfers the video and the operation information to the operator control system 10 at a predetermined timing. The predetermined timing may be a predetermined time interval. Further, the predetermined timing may be a time when a transfer request is received from the operator control system 10.

The storage unit 114 is a storage device that stores a program for realizing each function of the moving object 100. Further, the storage unit 114 may store the video captured by the imaging unit 121 and the operation information acquired by the operation information acquisition unit 112.

Configuration of the Operator Control System 10

Figure 5:
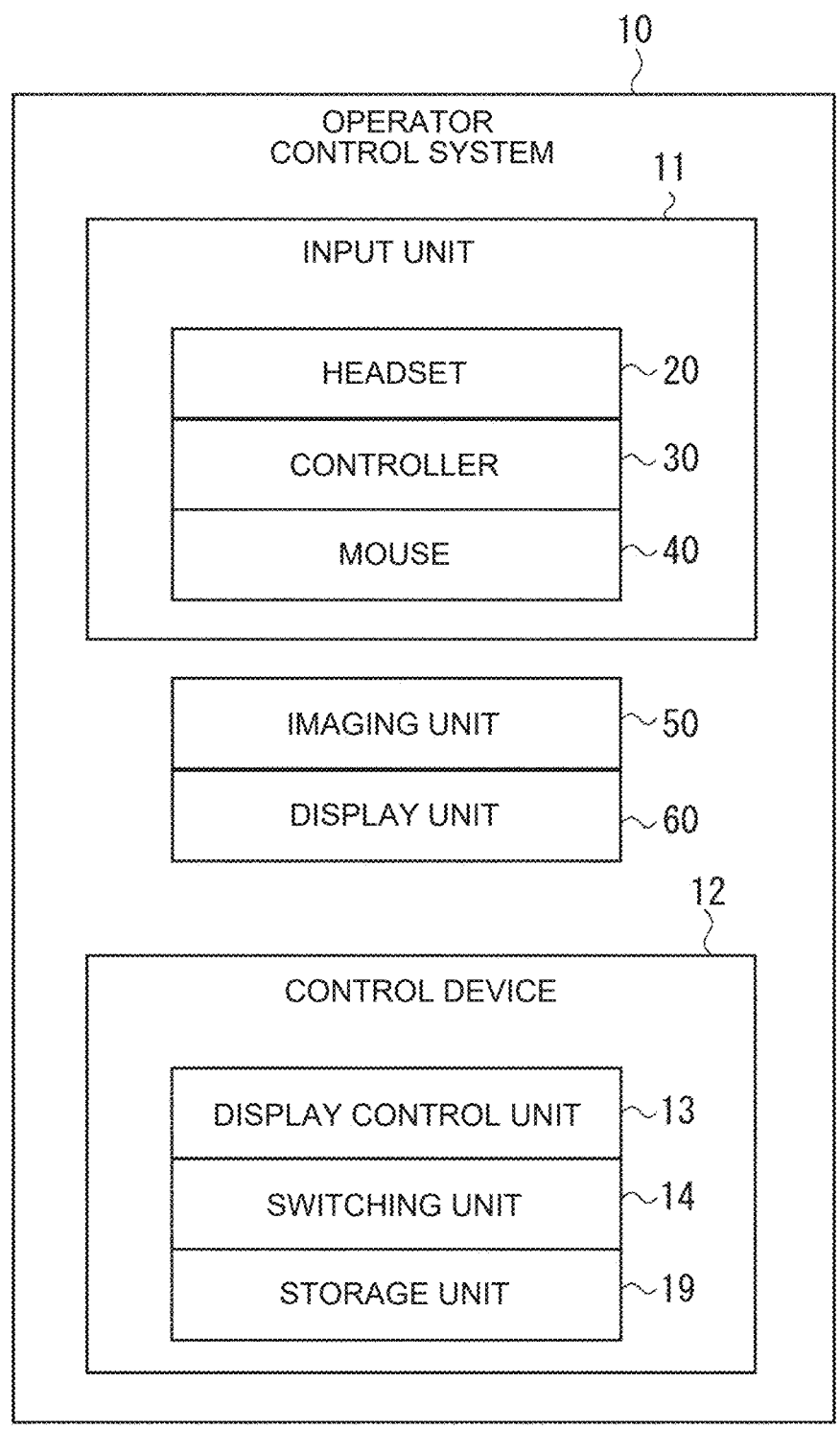
FIG. 5 is a block diagram illustrating a configuration of a control device according to the first embodiment.
Figure 6:
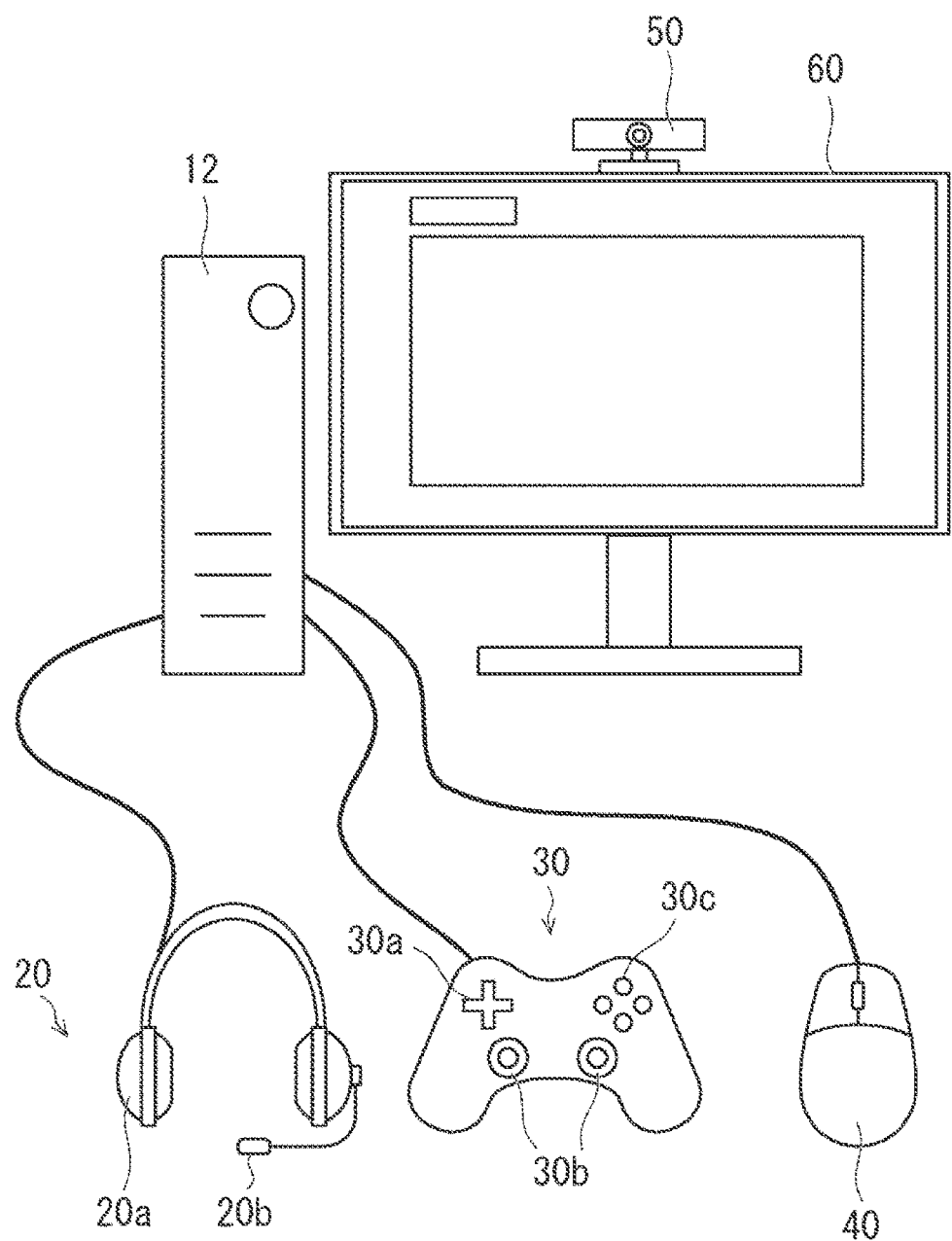
FIG. 6 is a diagram illustrating an example of an external appearance of the control device according to the first embodiment.

Next, the configuration of the operator control system 10 according to the present embodiment will be described with reference to FIG. 5 and FIG. 6. FIG. 5 is a block diagram illustrating a configuration of the operator control system 10. FIG. 6 is a diagram illustrating an example of an external appearance of the operator control system 10.

The operator control system 10 is a computer for performing the switching process according to the present embodiment. The operator control system 10 may be, for example, a PC (Personal Computer), a tablet terminal, a smart phone, a mobile phone terminal, or the like. The operator control system 10 includes an input unit 11, an imaging unit 50, a display unit 60, and a operator control device 12.

The input unit 11 is an input device that receives an input from the operator P. In FIGS. 5 and 6, a headset 20, a controller 30, and a mouse 40 are illustrated as an example of the input unit 11. Since these are examples of the input unit 11, the input unit 11 may include some of them or may include other input devices.

The headset 20 includes a speaker 20a and a microphone 20b. The speaker 20a outputs audio. The microphone 20b collects the sound of the operator P. The operator P uses the speaker 20a and the microphone 20b to input and output sounds to and from the operator control system 10 by attaching the headset 20 to the head. As a result, the operator P can talk with a user who is in the vicinity of the moving object 100 to be operated. The headset 20 may be used for voice input to the moving object 100 or the like. For example, the operator control system 10 may recognize the voice of the operator P using a well-known voice recognition technique.

The controller 30 receives an operation from the operator P and performs an input operation on the operator control system 10. The controller 30 may be, for example, a game controller used in a video game or the like.

The controller 30 includes, for example, a cross key 30a, a joystick 30b, and a plurality of button 30c. The operator P maneuvers the moving object 100 using the controller 30. The mouse 40 receives an operation from the operator P and performs an input operation on the operator control system 10. The operator P may select an icon displayed on the display unit 60 using the input unit 11.

The imaging unit 50 is an image capturing device that captures an image around the operator control system 10 from a predetermined position and acquires an image. The predetermined position may be a position where the operator P can be photographed. In the illustrated example, the imaging unit 50 is provided at an upper portion of the display unit 60. In this example, the imaging unit 50 photographs a range including the face region of the operator P. Like the imaging unit 121, the imaging unit 50 may be a two-dimensional camera or the like. The imaging unit 50 outputs an image obtained by photographing to the operator control system 10.

The display unit 60 displays display information including a video captured around the moving object 100. The image may be an image captured by the imaging unit 121 or an image captured by another image capturing apparatus. The other imaging device may be a camera included in a mobile terminal carried into the moving object 100, a camera included in a wearable terminal worn by an occupant of the moving object 100, or the like. The present disclosure is not limited thereto, and images supplied from various video sources may be displayed.

The display unit 60 may be a display device that displays an image or the like. Similar to the display unit 122, the display unit 60 may be, for example, a liquid crystal display, an organic EL display, or the like. The display unit 60 may be a touch panel having a function of an input unit. The display unit 60 displays an image or the like under the control of the display control unit 13. The display unit 60 displays a screen including the video transferred from the moving object 100. The display unit 60 may display the surrounding environment of the moving object three-dimensionally around the operator P by using a three-dimensional projection (hologram) technique. The display unit 60 may project an image on a floor or a wall around the operator P using a technique such as project mapping.

Figure 7:
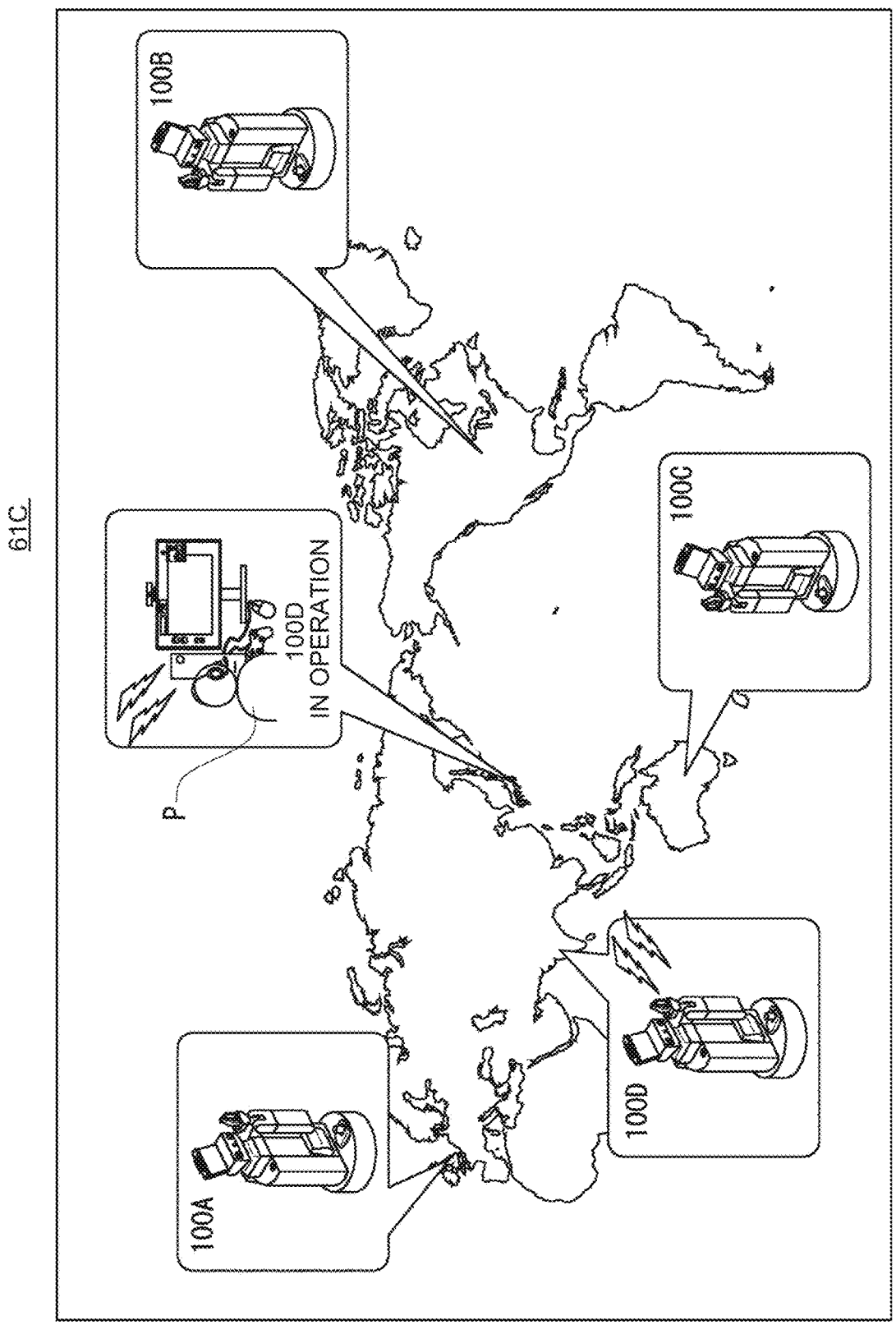
FIG. 7 is a diagram illustrating an example of a display screen displayed by the display unit according to the first embodiment.

An example of a display screen displayed on the display unit 60 will be described with reference to FIG. 7. FIG. 7 is a diagram illustrating an example of a display screen 61 displayed by the display unit 60. The display screen 61 shows the position of the operator P and the respective positions of 100D from the plurality of moving object 100A on the map using icons. The operator P can operate the operator control system 10 to control the moving object 100 in a remote place while being at home or the like.

In the following explanation, the present embodiment will be described using 100D from four moving object 100A as the plurality of moving objects 100, but the number of moving objects 100 is not limited to four. Further, in the following explanation, the operator P mainly describes a case where the operator is operating the moving object 100D (the first moving object). The object to be controlled is a moving object 100D. In addition, 100C from the moving object 100A is a moving object as a switching destination.

For example, it is assumed that the operator P is trying to switch the object to be operated from the moving object 100D to the moving object 100B (second moving object). The operator P requests the operator control system 10 to switch the control target by clicking the icon of the moving object 100B displayed on the display screen 61. In addition to the icons, for example, the moving object names of 100C from the moving object 100A may be listed on the display screen 61. The operator P makes a switch by clicking on the moving object in the moving object 100B.

Figure 8:
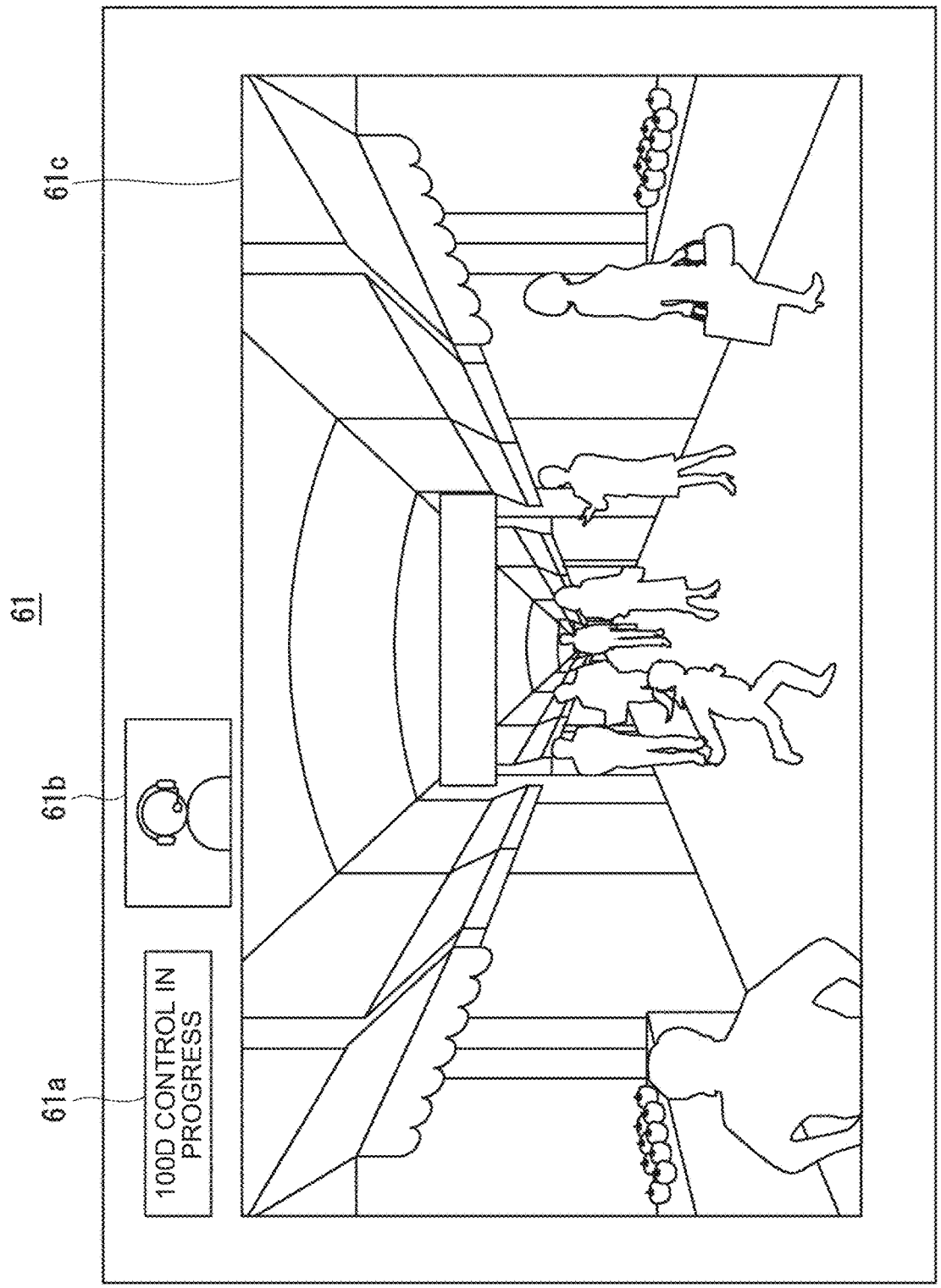
FIG. 8 is a diagram illustrating an example of another display screen displayed by the display unit according to the first embodiment.

Here, another display screen displayed by the display unit 60 will be described with reference to FIG. 8. FIG. 8 is a diagram illustrating an example of another display screen 61 displayed by the display unit 60. As illustrated in the drawing, the display screen 61 includes a control target display area 61a, an operator display area 61b, and an image display area 61c.

The control target display area 61a is an area for displaying information of the control target moving object 100. The control target display area 61a displays identification information for identifying the moving object 100 currently operated by the operator P. The identification information may be, for example, an identification name, an identification number, or the like of each of the plurality of moving objects 100. In the illustrated embodiment, the control target display area 61a is displayed as "100D control in progress". Thus, the control target display area 61a indicates that the operator P is operating the moving object 100D.

The operator display area 61b is an area for displaying information related to the operator P. The operator display area 61b displays, for example, images captured by the imaging unit 50.

The image display area 61c is an area for displaying an image transferred from the moving object 100 to be operated. In FIG. 8, the image display area 61c displays an image transferred from the moving object 100D. The display screen 61 is not limited to the above, and may include various display areas related to the operation of the moving object 100. For example, the display screen 61 may include buttons for selecting the start, stop, switch of the control target, presence or absence of audio output, presence or absence of video output, and the like. Alternatively, these buttons and the like may be arranged in an area other than the image display area 61c.

The operator P operates the moving object 100D by operating the headset 20, the controller 30, the mouse 40, and the like while viewing the display screen 61. The steering operation is an operation for controlling the operation of the moving object 100D. The maneuvering operation may include, for example, an operation related to the movement of the moving object 100. The operation related to the movement is an operation of advancing, retracting, accelerating, decelerating, or rotating the moving object 100. If the vehicle 100 is a flying drone or the like, the maneuvering of the vehicle 100 may include raising or lowering of the vehicle 100 or the like. In addition, the steering operation may include expansion and contraction of the head portion 120, expansion and contraction of the arm portion 130, image capturing, audio output, or the like.

Since the above-described example of the operator control system 10 is an example, the configuration of the operator control system 10 can be changed as appropriate. For example, when the display unit 60 is a touch panel or the like having an input function, the operator control system 10 may be configured not to include the controller 30 and the mouse 40. Further, a keyboard or the like may be used as the input unit 11. Further, in a case where an image on the operator P side is not transmitted to the moving object 100, the imaging unit 50 may not be provided.

In addition, as illustrated in FIG. 7, the display unit 60 displays an icon for receiving a switching request from the operator P in the video display area 61c in association with each of the plurality of moving objects 100.

When the operator P is operating the moving object 100D, the display unit 60 displays an icon for accepting a switching request from the operator P on the video display area 61c in association with each of the moving object 100A which is a switching destination candidate and C. The icon may simulate the appearance of the moving object 100 as shown in FIG. 7. Here, an icon using another display form will be described with reference to FIG. 9.

Figure 9:
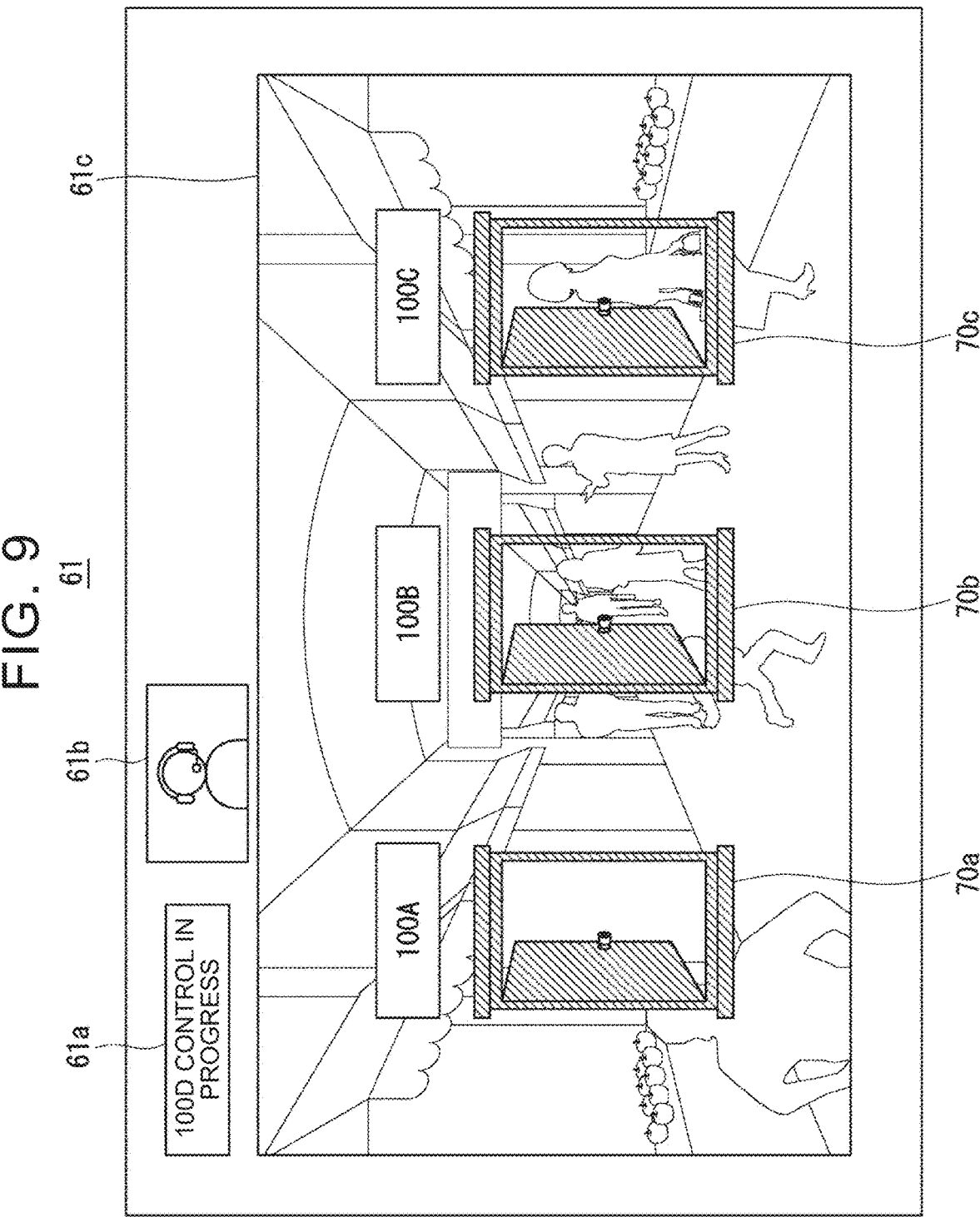
FIG. 9 is a diagram illustrating an example of a display screen on which an icon according to the first embodiment is displayed.

FIG. 9 is a diagram illustrating an example of a display screen 61 on which an icon simulating the shape of a door is displayed. As shown in the drawing, the image display area 61c includes 70c from the icon 70a associated with 100C from the moving object 100A. The image display area 61c is superimposed and displayed on an image in which 70c is acquired by the moving object 100D from the icon 70a using the augmented reality technique.

As shown in FIG. 9, for example, 70c from the icon 70a may include an entry image area indicating a virtual entry associated with 100C from the moving object 100A of the switching destination. The entrance image area may be formed, for example, using an image of the doors, such as 70c from the icon 70a shown. The entrance image region may be, for example, a gate, a window, or a hole. Without being limited to this, icons of various shapes may be used as the entrance image region.

70c from the icon 70a is provided so that the control target can be selected from the moving object 100A and 100C in accordance with the operation of the switching source moving object 100D that is the control target. In 70c from the icon 70a, the display mode may change according to the control of the display control unit 13.

For example, it is assumed that an object to be operated is switched from the moving object 100D to the moving object 100B. For example, when the moving object 100D moves forward according to the operation of the operator P, the displaying mode changes as the moving object 100D moves from 70a to 70c. Specifically, the display unit 60 displays the video display area 61c such that 70c increases on the screen from the icon 70a as the moving object 100D advances.

Figure 10:
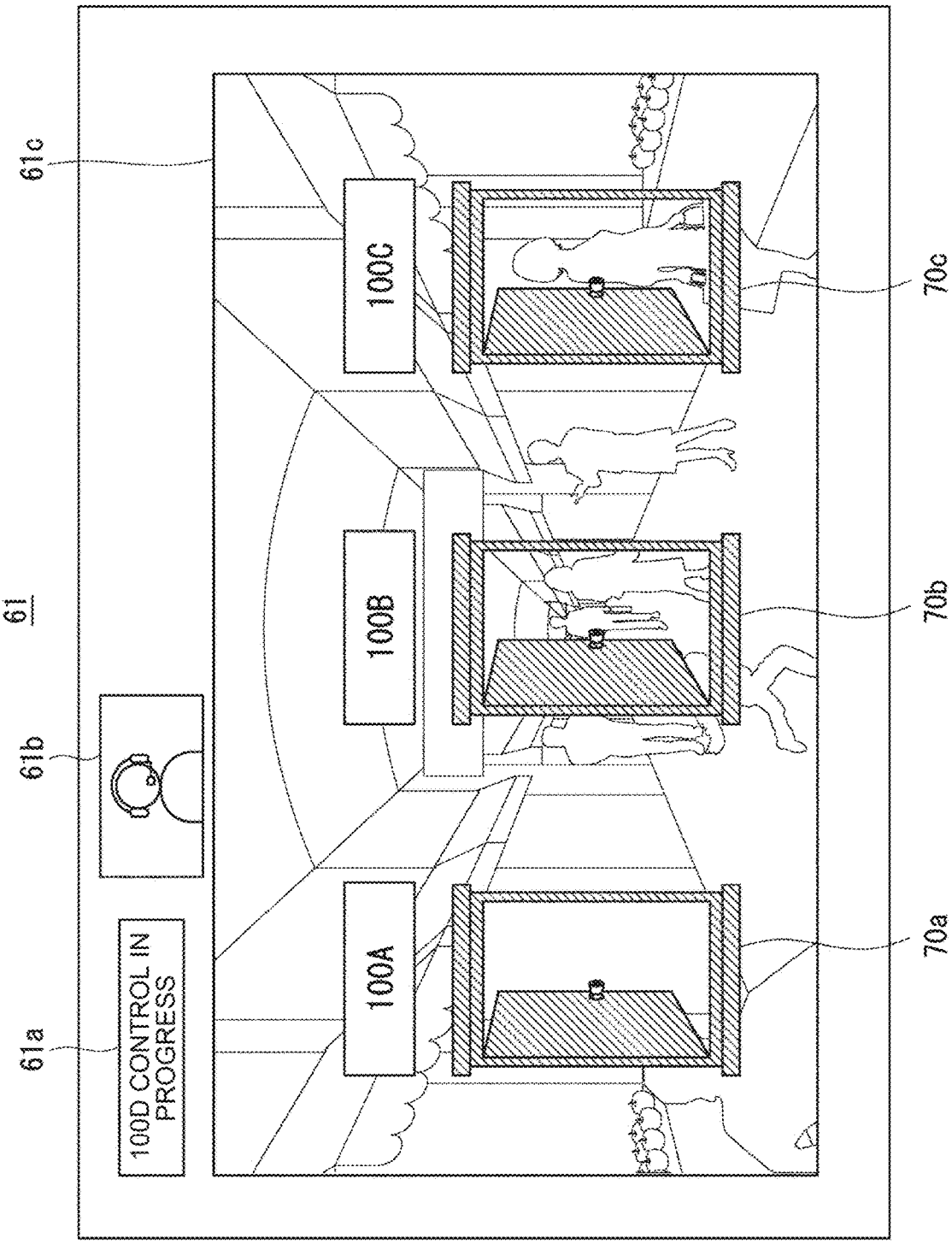
FIG. 10 is a diagram illustrating a state in which a display mode of an icon changes with movement of a moving body according to the first embodiment.
Figure 11:
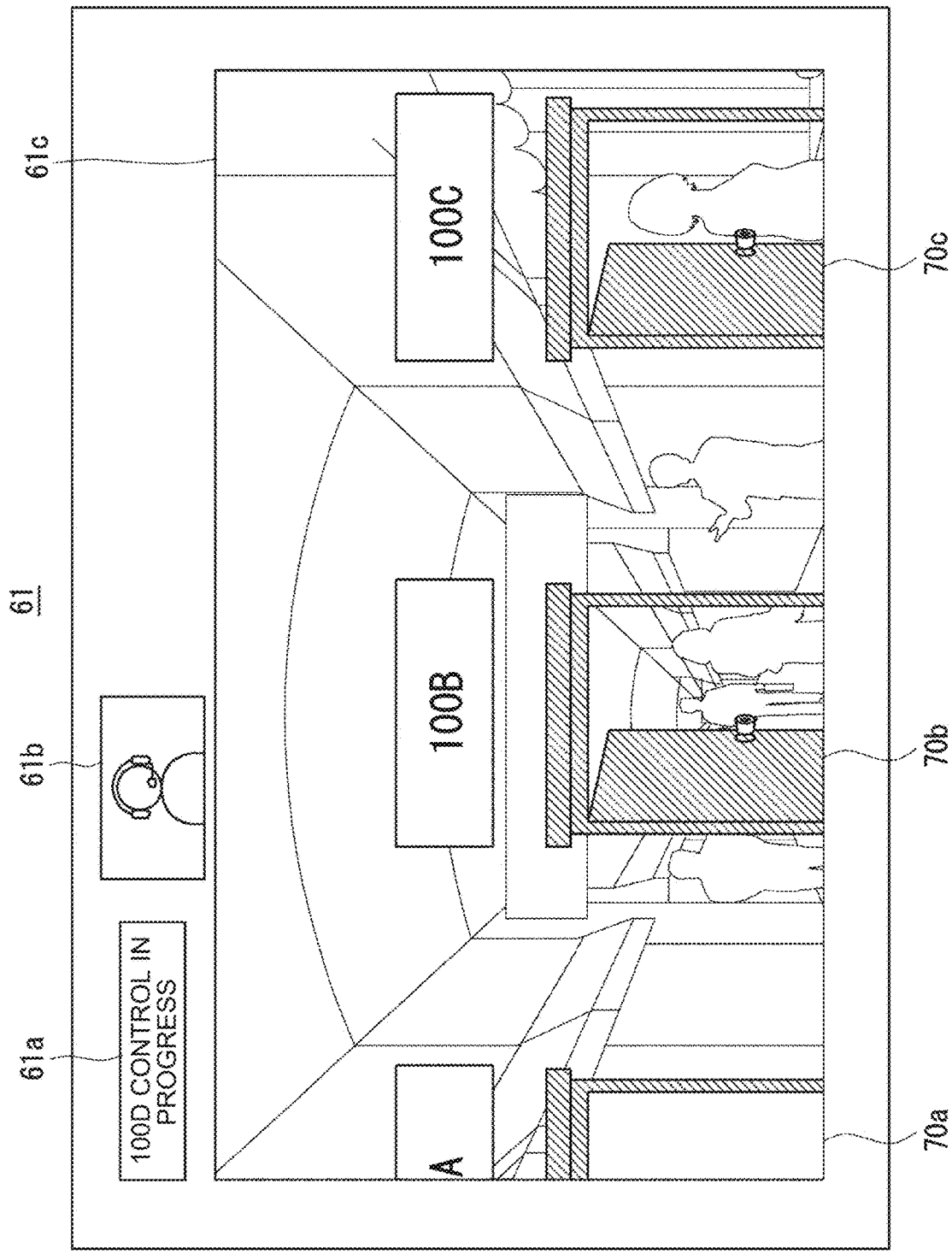
FIG. 11 is a diagram illustrating a state in which a display mode of an icon changes with movement of a moving body according to the first embodiment.
Figure 12:
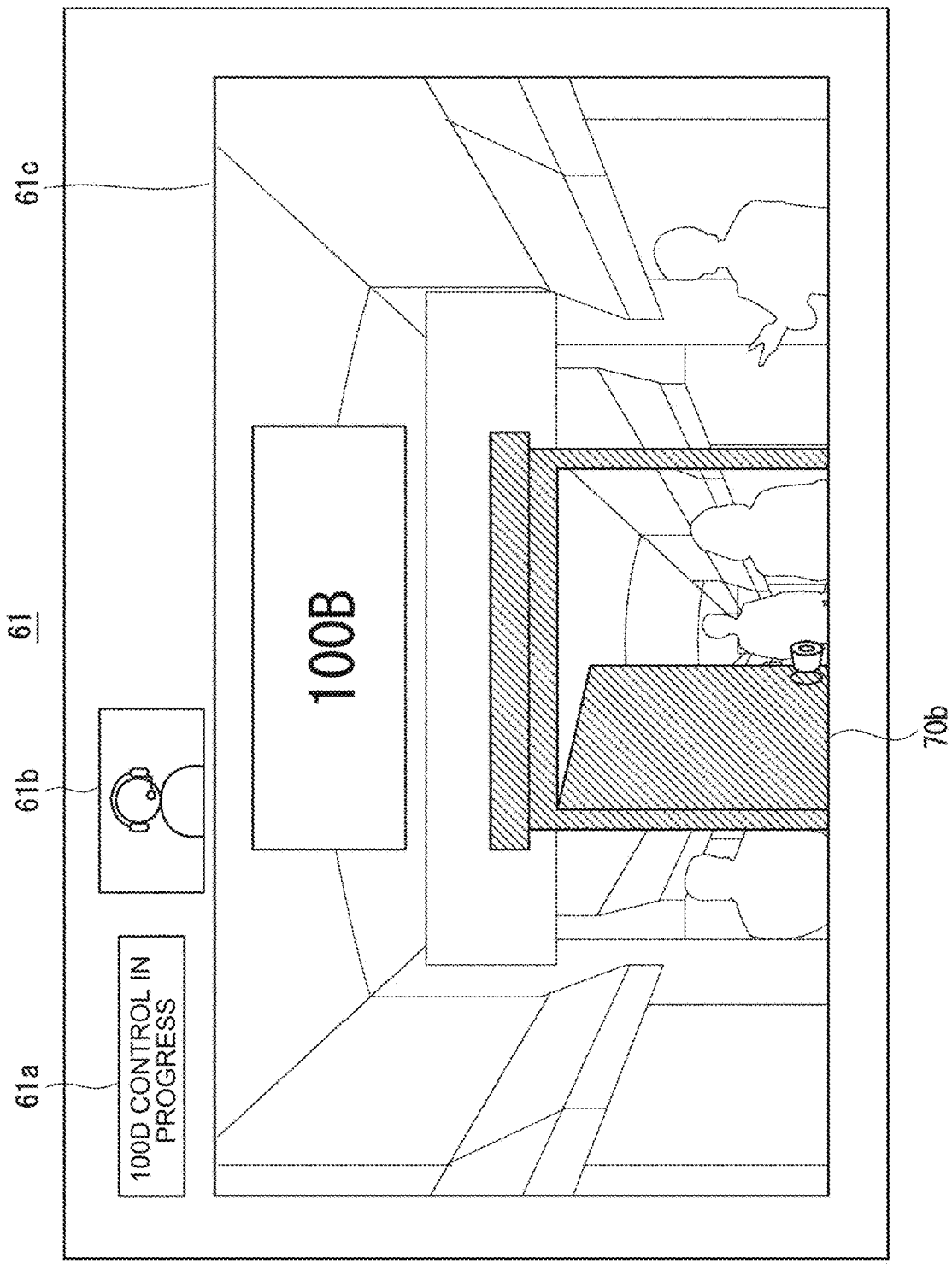
FIG. 12 is a diagram illustrating a state in which a display mode of an icon changes with movement of a moving body according to the first embodiment.

FIG. 10 to FIG. 12 are diagrams illustrating a state in which 70c displaying mode changes from the icon 70a as the moving object 100D moves. As the moving object 100D is advanced by the operation of the operator P, in the order of FIG. 10, FIG. 11, and FIG. 12, a state is shown in which the indication of 70c changes from the icon 70a to be larger. When the moving object 100D is retracted, the display unit 60 displays the video display area 61c such that the display of 70c from the icon 70a becomes smaller.

In this way, the display unit 60 can express that the moving object 100D approaches the icon 70a to 70c and that the moving object 100D moves away from the icon 70a to 70c.

The operator P maneuvers the moving object 100D such that the moving object 100D gradually approaches the icon 70a to 70c. The operator P further advances the vehicle 100D from the condition of FIG. 12 so that the vehicle 100D passes through the door shown in the icon 70b.

The operator control system 10 calculates a distance between the moving object 100D and the icon 70b in the displayed virtual space. When the distance between the moving object 100D and the icon 70b is less than the predetermined threshold value, the display unit 60 switches the display screen from the image of the moving object 100D to the image of the moving object 100B. Thus, the display unit 60 can express on the screen that the moving object 100D has passed through the door of the icon 70b.

As described above, when the moving object 100D operates to pass through any of 70c from the icon 70a on the screen, the display unit 60 displays the video acquired by the moving object 100 corresponding to the passed icon on the video display area 61c and switches the video. By doing so, the operator P can obtain a sense of having moved from the moving body of the switching source to the moving body of the switching destination.

Figure 13:
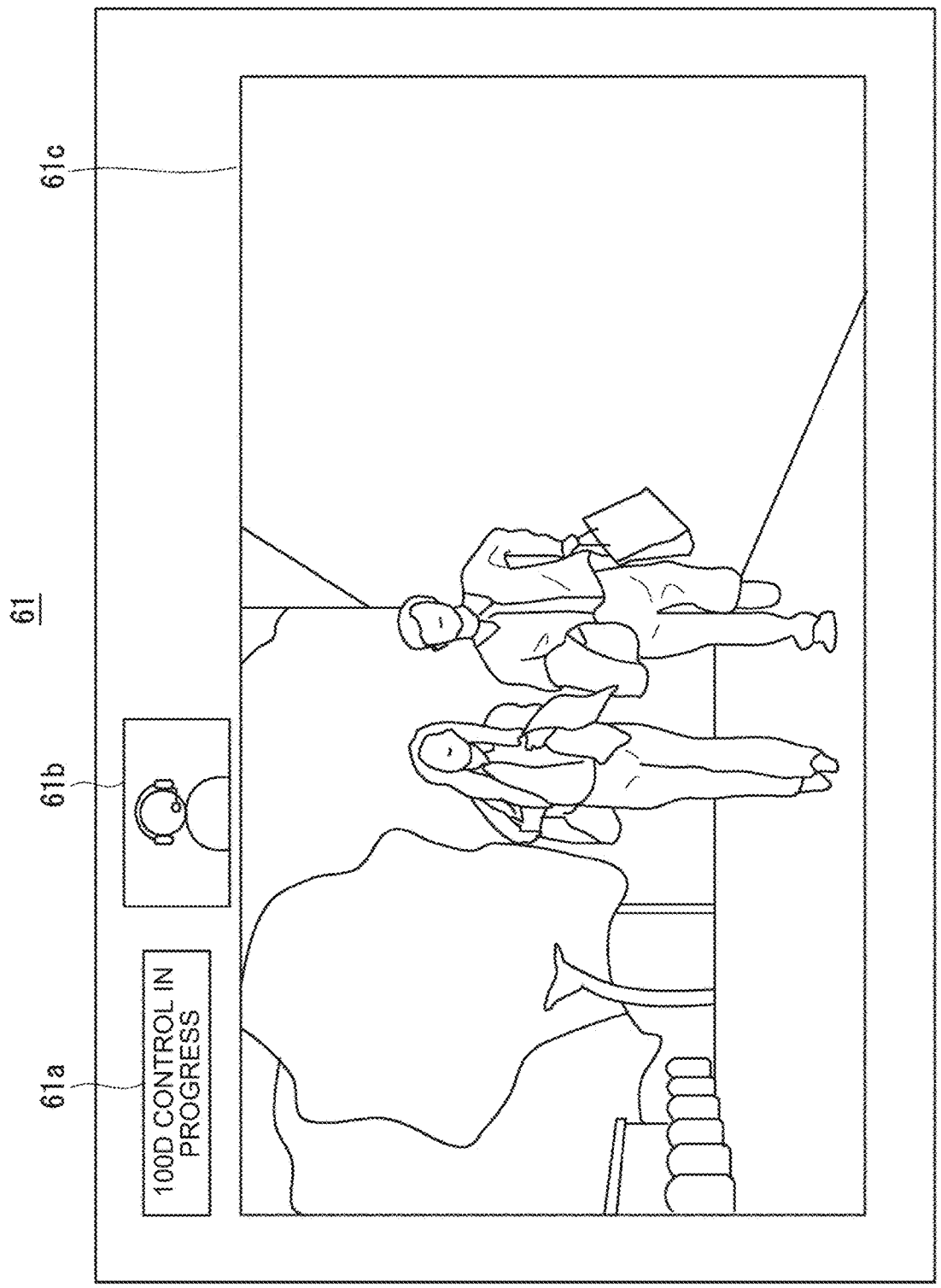
FIG. 13 is a diagram illustrating a display screen after the switching process according to the first embodiment.

FIG. 13 is a diagram illustrating the display screen 61 after switching. The image display area 61c indicates an image acquired by the imaging unit 121 of the moving object 100B of the switching destination. In addition, the control target display area 61a indicates that the present control target is the moving object 100B.

Returning to FIG. 5, the description will be continued. The operator control device 12 controls each functional unit of the operator control system 10. That is, the operator control device 12 controls the headset 20, the controller 30, the mouse 40, the imaging unit 50, and the display unit 60. The operator control device 12 includes a display control unit 13, a switching unit 14, and a storage unit 19.

The display control unit 13 generates a display screen on the display unit 60 and controls display on the display unit 60. For example, the display control unit 13 controls the display of the above-described icon. The display control unit 13 changes the display mode of the icon in accordance with the operation of the moving object 100 to be operated. For example, the display control unit 13 changes the display mode of 70c from the icon 70a in accordance with the operation data of the moving object 100D to be operated.

The switching unit 14 uses the operation information transferred from the moving object 100 to switch the control target from the first moving object that is the switching source to the second moving object that is the switching destination.

For example, the switching unit 14 performs a switching process for switching the moving object 100 to be operated in response to a switching request from the operator P. The switching request is a request for switching the control target from the control target moving object 100 to another moving object 100. The switching request may include information of the moving object 100 of the switching destination. The information is identification information for identifying the moving object 100. As a result, the switching unit 14 specifies the moving object 100 of the switching destination.

The operator P may make switching requests in a variety of ways. For example, as described above, the operator P advances the moving object 100D of the object to be operated so as to approach any one of 70c from the icon 70a. The operator P requests switching to the moving object 100B associated with the icon 70b by operating the moving object 100D so as to pass through the door indicated by the icon 70b.

In addition, the operator P may select the icon 70b by clicking the icon 70b with the mouse 40. Accordingly, the operator P can make a switching request for switching the control target to the moving object 100B associated with the icon 70b.

In addition, the operator P may issue a voice such as "move to the moving object 100B" to make a switching request using a voice recognition technique. In addition, the operator P may make a switching request using a head-mounted display or the like. For example, an icon may be selected by interlocking the orientation of the face of the operator P with the orientation of the head portion 120 of the moving object 100D being operated.

Here, the switching process performed by the switching unit 14 will be described. The switching unit 14 estimates the selected icon based on the operation information A1 of the moving object 100D, and starts the switching process according to the estimation result. The switching unit 14 detects that the moving object 100D has approached any one of 70c from the icon 70a. For example, the switching unit 14 detects that the moving object 100D approaches the icon 70b when the distance between the moving object 100D and the icon 70b is less than a predetermined threshold. The predetermined threshold value may be fixed in advance or may be provided so as to be appropriately changeable.

It is assumed that the switching unit 14 detects that the moving object 100D has approached the icon 70b. The switching unit 14 estimates that a switching request from the moving object 100D to the moving object 100B is made by the operator P.

The switching unit 14 starts the operation of the moving object 100B that is the switching destination. Specifically, the switching unit 14 transmits the operation information A1 indicating the operation of the moving object 100D of the switching source to the moving object 100B of the switching destination, and causes the moving object 100B to start the operation based on the operation information A1. The operation information A1 may include, for example, the velocity of the moving object 100D.

For example, the switching unit 14 controls the moving object 100B so that the moving object 100B moves at the same velocity as the moving object 100D. At this stage, the object to be operated remains in the moving object 100D. That is, the switching unit 14 starts the operation of the moving object 100B based on the operation information A1 of the moving object 100D while the operator P maintains the operation of the moving object 100D.

The moving object 100B performs an operation such that a difference between the operation information A2 indicating the operation of the moving object 100B and the operation information A1 becomes small. For example, it is assumed that the speed of the moving object 100B is smaller than the speed of the moving object 100D. The moving object 100B accelerates the moving object 100B so that a difference between the speed of the moving object 100B and the speed of the moving object 100D becomes small.

As described above, the switching unit 14 switches the control target to the moving object 100D to the moving object 100B at a predetermined timing after the moving object 100B starts the operation based on the operation information A1. The switching unit 14 may determine a predetermined timing using a predetermined time interval. For example, the switching unit 14 switches the control target to the moving object 100B after a predetermined period of time has elapsed since the moving object 100B started.

In addition, the switching unit 14 may determine a predetermined timing in view of the operation status of the moving object 100B. For example, the switching unit 14 acquires the operation information A1 and the operation information A2, and compares the operation information A1 and the operation information A2. For example, when the difference between the operation information A1 and the operation information A2 is less than a predetermined threshold, the switching unit 14 switches the control target to the moving object 100B.

By doing so, it is possible to bring the operation information A2 of the moving object 100D close to the operation information A1 until the switching to the moving object 100B is completed. As a result, the operator P can switch the control target without uncomfortable feeling.

As described above, the switching unit 14 starts the switching process so as to switch the control target to the moving object 100B associated with the icon 70b estimated to be selected, so that the operation can be started at an earlier timing. The present disclosure is not limited thereto, and the switching unit 14 may start the switching process when the icon is actually selected.

The storage unit 19 is a storage device that stores a program for realizing each function of the operator control system 10. The storage unit 19 may store data acquired from 100D from the moving object 100A. For example, the storage unit 19 may store video or motion data obtained from each of 100D from the moving object 100A. Processing performed by the operator control system 10

Figure 14:
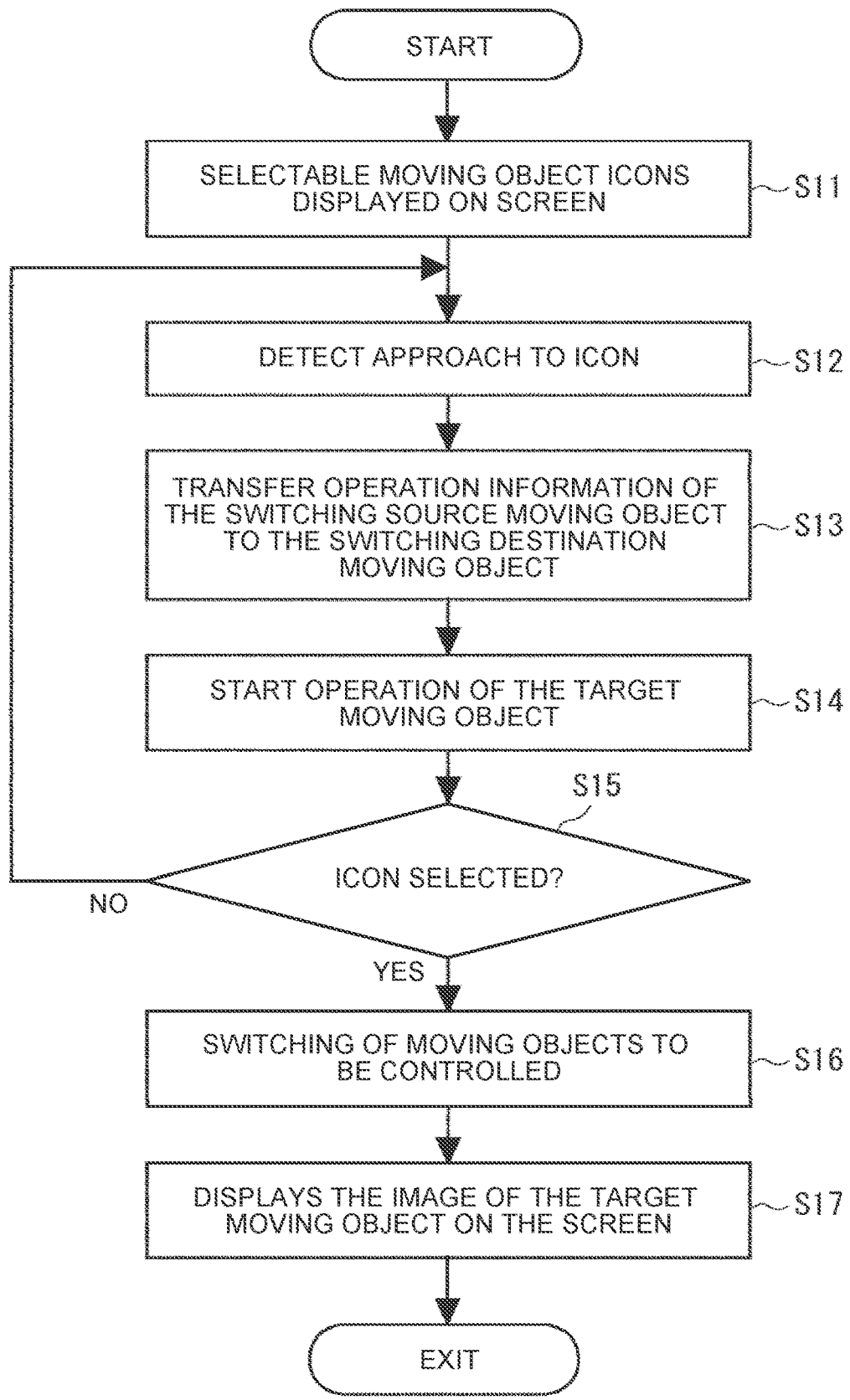
FIG. 14 is a flowchart illustrating a process performed by the control device according to the first embodiment.

Next, a switching process performed by the operator control system 10 according to the present embodiment will be described with reference to FIG. 14. FIG. 14 is a flowchart illustrating a process performed by the operator control system 10. As described above, the operator control system 10 performs a switching process of switching the control target from the moving object 100D to the moving object 100B. Further, it is assumed that the moving object 100B is switchable. Further, it is assumed that the operator control system 10 acquires operation information from each moving object 100 at any time.

First, the display control unit 13 causes the display unit 60 to display the moving object 100 that is a changeover candidate (S11). For example, the display control unit 13 causes the video display area 61c to display 70c from the icon 70a corresponding to each of 100C from the moving object 100A. As described with reference to FIGS. 9 to 12, 70c from the icon 70a are configured to be selectable by changing shapes in accordance with the operation of the moving object 100D and satisfying predetermined conditions.

The switching unit 14 estimates the selected icon based on the operation information A1 of the moving object 100D. Specifically, the switching unit 14 detects that the moving object 100D has approached any one of 70c from the icon 70a on the display (S12). For example, the switching unit 14 detects approaching when the distance between the moving object 100D and one of 70c from the icon 70a becomes less than a predetermined distance. Here, the switching unit 14 detects that the moving object 100D has approached the icon 70b.

As a result, the switching unit 14 estimates that the icon 70b is selected, and starts a switching process for switching the control target. Here, the switching unit 14 estimates the selected icon and starts the switching process, but the switching unit 14 may start the switching process in response to selection of the icon and a switching request.

The switching unit 14 transmits the operation information A1 of the moving object 100D that is the switching source to the moving object 100B that is the switching destination (S13). The operation information A1 is, for example, a velocity or a moving direction of the moving object 100D. Here, the switching unit 14 transmits the operation information A1, but the present disclosure is not limited thereto. The device for transferring the operation information to another moving object and the device for switching the control object may be provided separately. Therefore, a device other than the operator control system 10 may transmit the operation information A1 to the moving object 100B.

The switching unit 14 starts the operation of the moving object 100B based on the operation information A1 (S14). The switching unit 14 controls the moving object 100B so that the operation information A2 of the moving object 100B approaches the operation information A1.

The switching unit 14 determines whether or not an icon estimated to be selected is actually selected (S15). If not selected (NO of S15), the process returns to S12 of steps.

When the icon is selected (YES in S15), the switching unit 14 switches the control target from the moving object 100D to the moving object 100B (S16). The switching unit 14 may hold the switching until a predetermined timing. For example, when the operation information A1 and A2 include information on the speed, the switching unit 14 may switch the control target after the difference between the speed of the moving object 100B and the speed of the moving object 100D becomes less than a predetermined value.

The display control unit 13 acquires an image captured by the moving object 100B of the switching destination, and causes the image to be displayed on the image display area 61c (S17). As a result, the operator P can maneuver the moving object 100B using the input unit 11.

As described above, according to the operation system 1 of the present embodiment, the operator control system 10 that controls the plurality of moving objects 100 transfers the operation information indicating the operation of the first moving object that is the switching source to the second moving object that is the switching destination. The operator control system 10 performs a switching process of switching the control target from the first moving body to the second moving body after the second moving body starts the operation based on the operation information of the first moving body.

In this way, the operator control system 10 can duplicate the operation of the switching source moving object and cause the switching destination moving object to follow the operation. Further, since the operator control system 10 estimates the selected moving object using the icon of the display screen and starts the switching process, the switching can be performed more smoothly.

As a result, the operator can feel as if he/she moved to another place while riding on the same moving body. Therefore, in the case where the operator remotely steers a moving object such as a robot in the virtual space and walks in the virtual space, the operation system 1 can switch the control target without interrupting the sense of moving in the virtual space.

As described above, according to the operation system 1 of the present embodiment, it is possible to reduce the uncomfortable feeling when switching the moving object of the control target, and to provide the operator with a continuous movement experience in the virtual space.

Note that the configuration of the operation system 1 described above is merely an example, and the configuration of the operation system 1 may be changed as appropriate. For example, each of the operator control system 10 and the moving object 100 may be configured by using a device in which a plurality of configurations is aggregated. In addition, some or all of the functions of the operator control system 10 and the moving object 100 may be integrated into the same device. For example, although the operator control system 10 is shown outside the moving object 100 in FIG. 1, the operator control system 10 may be provided inside the moving object 100. In this case, the operator P may directly operate the operator control system 10 by riding on the moving object 100 or the like. Alternatively, the operator P may operate the operator control system 10 using an information terminal or the like capable of communicating with the operator control system 10. Further, each functional unit in each of the operator control system 10 and the moving object 100 may be distributed using a plurality of devices or the like.

First Modification of First Embodiment

Figure 15:
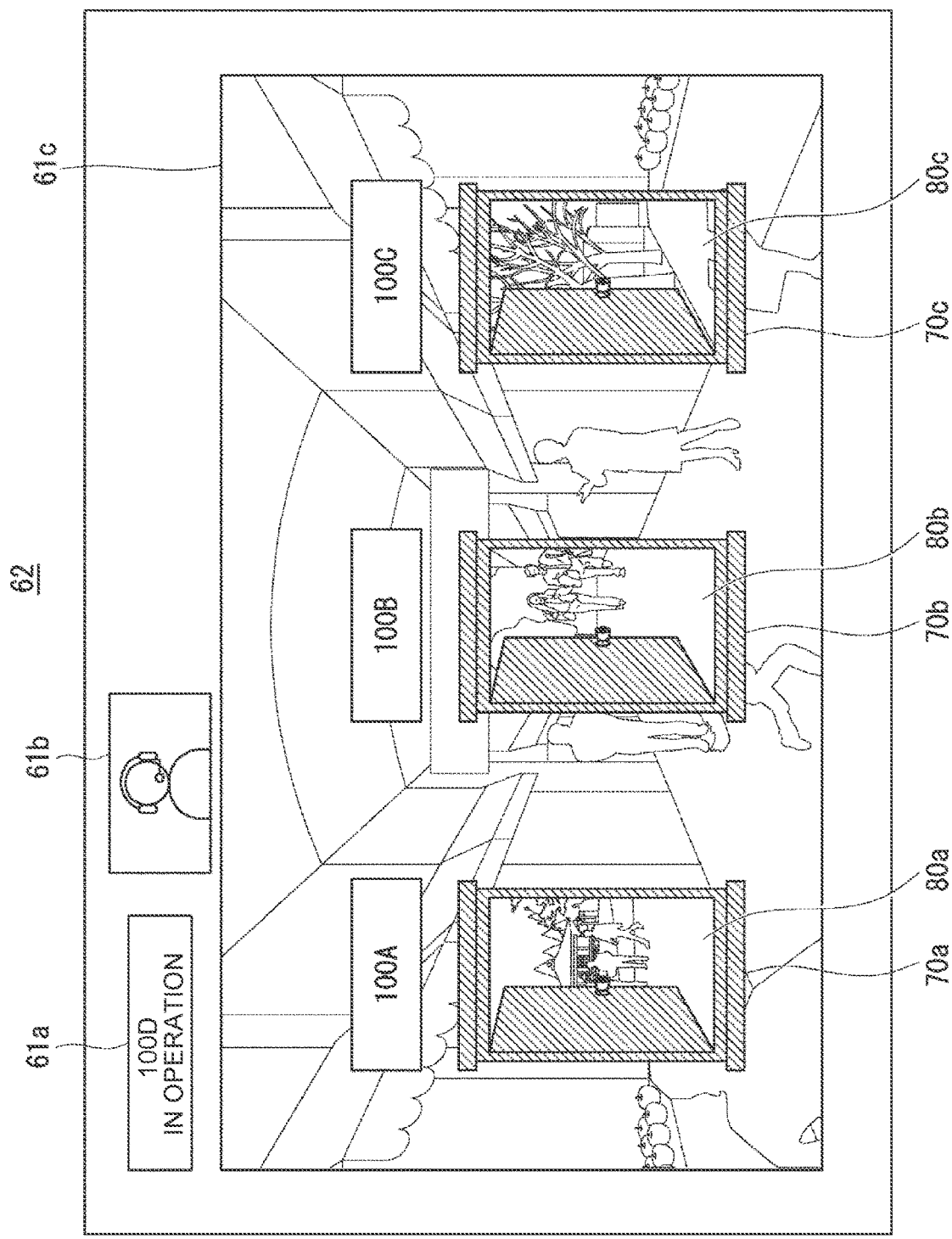
FIG. 15 is a diagram illustrating an example of a display screen according to a modification of the first embodiment.

A first modification of the first embodiment will be described with reference to FIG. 15. FIG. 15 is a diagram illustrating an example of a display screen 62 according to the present modification. The present modification is different from the first embodiment in that the icon further includes a video acquired by a moving object that is a candidate of a switching destination. Since the configurations of the operation system 1 and the operator control system 10 are the same as those of the first embodiment, the description thereof will be omitted.

As illustrated in FIG. 15, in the display screen 62, 70c from the icon 70a includes 80c from the switching destination video 80a. Each of 80c from the switching destination video 80a is a video acquired by 100C from the moving object 100A. Note that 80c from the switching destination video 80a may be still images.

As described above, by displaying the entrance area image and the switching destination image on the image display area 61c in a superimposed manner, the operator P can visually recognize the image of the moving object 100 of the switching destination from the door parts of the respective icons. As a result, the operator P can see the space viewed from the moving object 100 other than the object to be operated through the icon in the virtual space. In this way, the operator P can easily select the control target of the switching destination.

Second Modification of First Embodiment

Next, Modification 2 of Embodiment 1 will be described. In the first embodiment described above, an example has been described in which the switching unit 14 switches the control target from the first moving body to the second moving body after the second moving body starts the operation based on the operation information of the first moving body. Thus, in the first embodiment, the control target can be switched in a state in which the second moving body takes over the operation of the first moving body.

In this modification, after the first moving body starts the operation based on the operation information of the second moving body, the switching unit 14 switches the control target from the first moving body to the second moving body. In other words, in the present modification, the first moving body operates with the second moving body. Note that both of the first and second moving bodies may change the operation so as to approach the operation of each other.

Differences from the first embodiment will be described by appropriately replacing the flowchart shown in FIG. 14. In S13 of steps, the switching unit 14 transmits the operation information A2 of the second moving object (moving object 100B) to the first moving object (moving object 100D). In S14 of steps, the switching unit 14 starts the operation of the first moving object based on the operation information A2. The switching unit 14 controls the first moving object so that the operation information A1 of the first moving object approaches the operation information A2.

By doing so, for example, in a case where the second moving body is moving at a lower speed than the first moving body, the first moving body is controlled so that the moving speed becomes smaller in accordance with the speed of the second moving body. The speed may be controlled to be progressively smaller. In addition, when the operator P operates the first moving object, the first moving object may be controlled to move more slowly. Thus, in the present modification example, the moving object of the switching source can perform an operation corresponding to the operation of the moving object of the switching destination.

Third Modification of First Embodiment

Next, Modification 3 of Embodiment 1 will be described. In the first embodiment described above, an example has been described in which the switching unit 14 causes the display unit 60 to display an image of the second moving body after switching the control target from the first moving body to the second moving body.

In the present modification, the switching unit 14 adjusts the video captured around the second moving body in accordance with the operation information of the first moving body. The display unit 60 displays the adjusted video until the switching of the control target is completed after the second moving body starts the operation in accordance with the operation information of the first moving body. After displaying the image, the switching unit 14 switches the control target from the first moving object to the second moving object. The operator P visually recognizes the adjusted image, thereby making it possible to further reduce a sense of discomfort caused by the switching.

In the flowchart shown in FIG. 14, differences from the first embodiment will be described. The switching unit 14 detects that the first moving object (moving object 100D) has approached any of 70c from the icon 70a in S12 of steps, and then starts the switching process. Here, the switching unit 14 adjusts an image captured around the second moving object (moving object 100B) in accordance with the motion data of the first moving object.

Here, it is assumed that the timing at which the switching process is started is $T_0$, and the timing at which the switching process is completed and the display unit 60 displays the video of the second moving object is $T_1$. The switching unit 14 acquires and adjusts an image captured prior to $T_0$ in the second moving object, and acquires an adjusted image.

The switching unit 14 adjusts the video in accordance with the operation information A1 of the first moving object. The switching unit 14 adjusts the video captured by the second moving body so as to reduce a sense of discomfort when the video is switched from the video captured by the first moving body to the video captured by the second moving body.

For example, it is assumed that the first moving body moves at a higher speed than the second moving body. In this case, in the video captured by the second moving body, the surrounding landscape and the like change at a lower speed than the video captured by the first moving body. Therefore, when the video is simply switched, the sense of discomfort is large.

The switching unit 14 adjusts the video so that the video captured by the second moving object is displayed faster so that the respective videos are smoothly connected at $T_1$. The switching unit 14 may adjust the video so as to increase the velocity from $T_0$ to $T_1$. The switching unit 14 acquires an adjusted image displayed at a higher speed than the actual speed of the image captured by the second moving body. The switching unit 14 back-calculates the timing at which the adjusted video is displayed so that the video is connected at $T_1$, and causes the display unit 60 to display the adjusted video. Thus, the display unit 60 displays the adjusted image from $T_0$ to $T_1$.

After displaying the adjustment image on the display unit 60, the switching unit 14 switches the control target from the first moving body to the second moving body. The processes after S13 of steps are the same as those in the first embodiment. Note that the above-described processes relating to the adjusted video may be replaced with the processes of the steps S13 and S14 in order.

Note that, as the operation information A1, speed information obtained from sensors provided in the first moving body may be used, or speed information obtained by analyzing an image captured by the first moving body may be used. In addition, information other than the velocity may be used as the operation information A1.

As described above, according to this modification, by adjusting the reproduction speed of the video captured by the second moving body, it is possible to reduce the uncomfortable feeling caused by the switching of the steering target.

Embodiment 2

Configuration of the Operator Control System with Switching Video Generation Unit 10*a*

Figure 16:
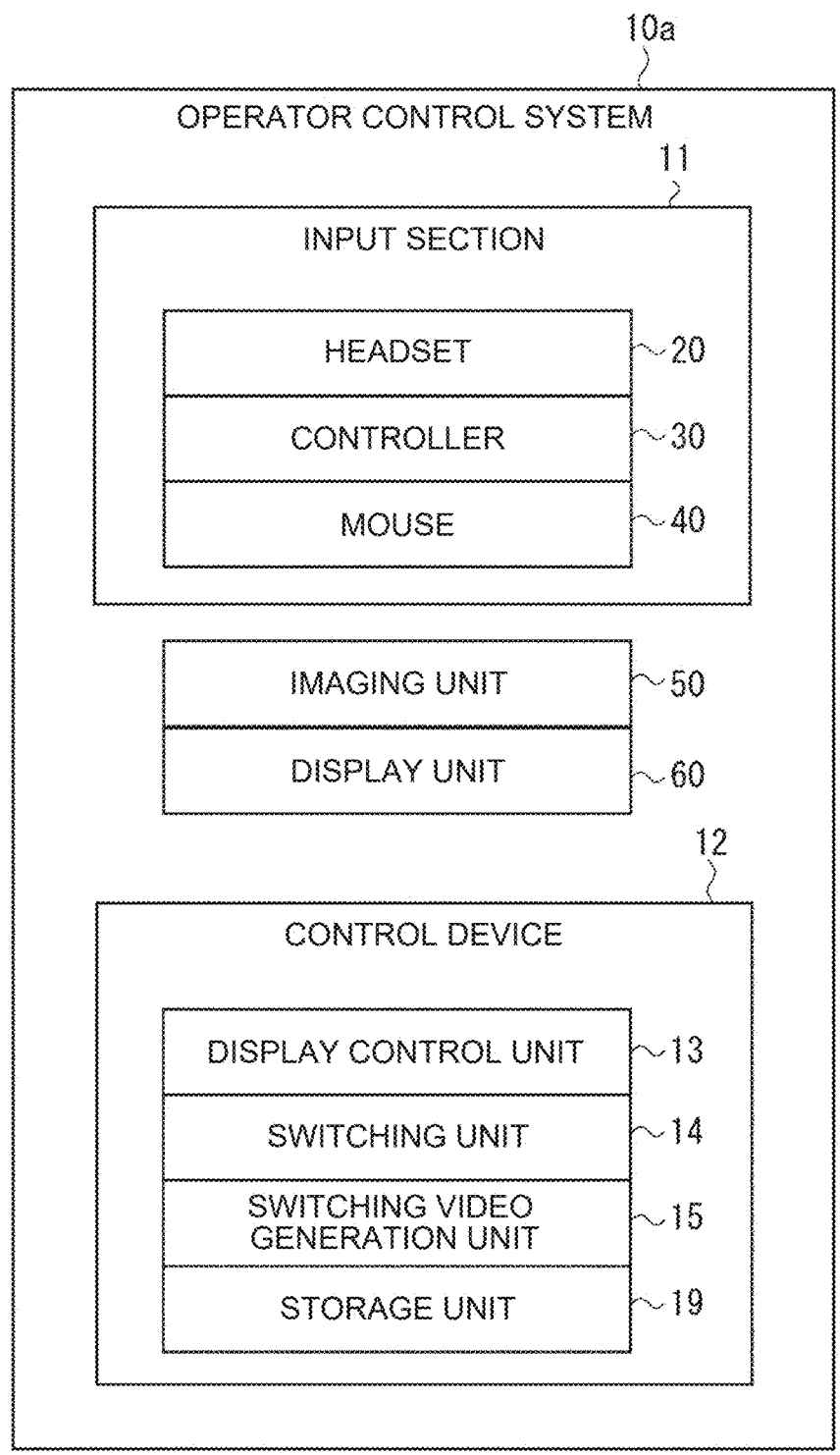
FIG. 16 is a block diagram illustrating a configuration of a control device according to a second embodiment.

Next, a second embodiment will be described with reference to FIG. 16. FIG. 16 is a diagram illustrating a configuration of a operator control system with switching video generation unit 10*a* according to the present embodiment. The operator control system with switching video generation unit 10*a* differs from the first embodiment in that a switching video generation unit 15 is provided in addition to the configuration of the operator control system 10 described above. Hereinafter, differences from the first embodiment will be mainly described, and description of overlapping contents will be omitted as appropriate. It should be noted that, as in the first embodiment, the switching source moving object is the moving object 100D and the switching destination moving object is the moving object 100B.

In the first embodiment, the moving object 100B of the switching destination is capable of quickly starting the operation in accordance with the control from the operator control system 10. However, when the operator control system 10 performs the switching process, the moving object 100B may not be able to immediately start the operation. For example, this is a case where a special operation needs to be performed on the moving object 100B.

For example, assume that a moving object 100B is connected to a charging station for charging and is charging. In order for the moving object 100B to begin operation, the moving object 100B needs to be disconnected from the charge station prior to the switching process. Therefore, even if the operator control system 10 performs the switching process, the moving object 100B cannot immediately start the operation. Therefore, the operator P cannot continuously switch the object to be operated, resulting in a sense of discomfort. The present embodiment can cope with such a problem.

In the operator control system with switching video generation unit 10*a*, the switching unit 14 determines whether or not the switching source moving object 100D can be switched to the switching destination moving object 100B based on the operation information A2 of the switching destination moving object 100B. The switching unit 14 determines whether or not switching from the moving object 100B to the moving object 100D can be performed based on the operation information A2 of the moving object 100B.

For example, the switching unit 14 determines whether or not switching is possible by determining whether or not the moving object 100B can operate within a predetermined period based on the operation information A2. For example, when the charging station is being connected as described above, the switching unit 14 determines that a predetermined time or more is required for the detachment operation. In this situation, the switching unit 14 determines that switching to the moving object 100B is not enabled.

When it is determined that switching to the moving object 100B is not available, the switching unit 14 causes the video display area 61*c* to display the switching video generated by the switching video generation unit 15. The switching unit 14 causes the switching image to be displayed on the image display area 61*c*, and then switches the control target from the moving object 100D to the moving object 100B at predetermined timings.

The switching unit 14 may determine a predetermined timing in the same manner as in the first embodiment. The switching unit 14 may determine a predetermined timing using a predetermined time interval. Alternatively, the switching unit 14 may determine a predetermined timing in view of the operation state of the moving object 100B. For example, the switching unit 14 may display the switching image until the disconnection from the charging station is completed, and then switch the control target.

When the switching unit 14 determines that the control target cannot be switched, the switching video generation unit 15 generates a switching video using the video acquired in the moving object 100D and the video acquired in the moving object 100B. Hereinafter, the video acquired by the moving object 100D is referred to as a video V1, the video acquired by the moving object 100B is referred to as a video V2, and the video generated by the switching video generation unit 15 is referred to as a switching video V3.

The switching video generation unit 15 generates a switching video V3 that reduces the uncomfortable feeling of the operator P that is felt when the display of the video display area 61*c* is switched from the video V1 to the video V2. The video V1 and V2 may be videos stored in the storage units 114 of the moving object 100D and 100B, respectively.

For example, the switching video generation unit 15 generates the switching video V3 by using the video V1 and the video V2 acquired in a predetermined period based on the date and time of image capturing. The switching video generation unit 15 may generate the switching video V3 from the video V1 and V2 by using a well-known technique. For example, the switching video generation unit 15 generates a switching video V3 that performs a zoom-in operation from the video V1 to the video V2. The switching video generation unit 15 may generate a switching video V3 that connects the video V1 and the video V2 using various methods.

Process Performed by the Operator Control System with Switching Video Generation Unit 10*a*

Figure 17:
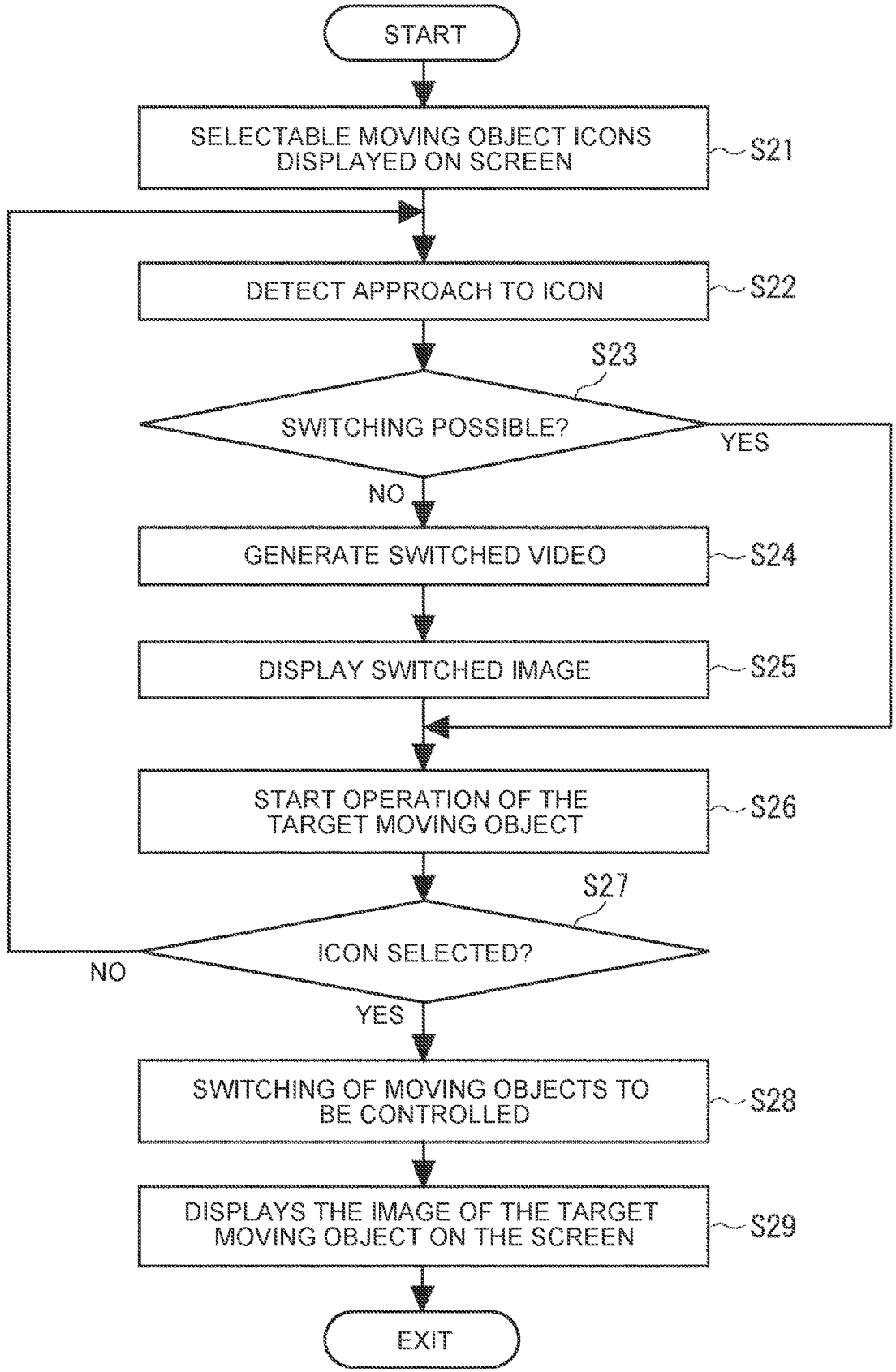
FIG. 17 is a flowchart illustrating processing performed by the control device according to the second embodiment.

Next, referring to FIG. 17, a switching process performed by the operator control system with switching video generation unit 10*a* according to the present embodiment will be described. FIG. 17 is a flow chart illustrating a process performed by the operator control system with switching video generation unit 10*a*. As described above, the operator control system with switching video generation unit 10*a* performs a switching process of switching the control target from the moving object 100D to the moving object 100B.

Further, it is assumed that the operator control system with switching video generation unit 10*a* acquires motion data from the moving objects 100 at any time.

First, the display control unit 13 causes the display unit 60 to display the moving object 100 that is a changeover candidate (S21). For example, the display control unit 13 causes the video display area 61*c* to display 70*c* from the icon 70*a* corresponding to each of 100C from the moving object 100A. As in the first embodiment, 70*c* from the icon 70*a* is configured to be selectable by changing shapes in accordance with the operation of the moving object 100D and satisfying a predetermined condition.

The switching unit 14 estimates the selected icon based on the operation information A1 of the moving object 100D. The switching unit 14 detects that the moving object 100D has approached any one of 70*c* from the icon 70*a* on the display (S22). Here, the switching unit 14 detects that the moving object 100D has approached the icon 70*b*.

The switching unit 14 determines whether or not switching from the moving object 100D to the moving object 100B can be performed based on the operation information A2 of the moving object 100B (S23). If it is determined that switching can be performed (YES of S23), the process proceeds to S26 of steps.

When it is determined that the switching is not available (NO in S23), the switching video generation unit 15 generates the switching video V3 using the video V1 acquired by the moving object 100D and the video V2 acquired by the moving object 100B (S24). For example, the switching video V3 may be a video that performs a zoom-in operation from the video V1 to the video V2.

The switching unit 14 displays the switching video V3 on the video display area 61*c* (S25). Thus, the operator P can visually recognize the switching video V3.

Subsequently, the switching unit 14 starts the operation of the moving object 100B (S26). The switching unit 14 operates the moving object 100B so as to be able to switch to the moving object 100B. For example, the switching unit 14 controls the moving object 100B so as to detach the moving object 100B from the charge station. In this way, the operator control system with switching video generation unit 10*a* can change the moving object 100B to a switchable status while the operator P is watching the switching video V3.

The switching unit 14 determines whether or not an icon estimated to be selected is actually selected (S27). If not selected (NO of S27), the process returns to S22 of steps.

When the icon is selected (YES in S27), the switching unit 14 switches the control target from the moving object 100D to the moving object 100B (S28). The switching unit 14 may hold the switching until a predetermined timing. For example, the switching unit 14 determines whether or not the moving object 100B has transitioned to a switchable status. The switching unit 14 may switch the control target when it is determined that the moving object 100B has transitioned to a switchable status.

The display control unit 13 acquires an image captured by the moving object 100B of the switching destination, and causes the image to be displayed on the image display area 61*c* (S29). As a result, the operator P can maneuver the moving object 100B using the input unit 11.

In S26 of steps, the switching unit 14 may further start the operation of the moving object 100B based on the operation information A1 of the moving object 100D as in the first embodiment. The switching unit 14 transmits the operation information A1 to the moving object 100B. The operation information A1 is, for example, a velocity or a moving direction of the moving object 100D. The switching unit 14 controls the moving object 100B so that the operation information A2 of the moving object 100B approaches the operation information A1.

In this way, the operator control system with switching video generation unit 10*a* can change the moving object 100B to a switchable state while displaying the switching video V3, and can bring the operation of the moving object 100B close to the operation of the moving object 100D.

As described above, in the operation system 1 according to the present embodiment, in the operator control system with switching video generation unit 10*a* that controls the plurality of moving objects 100, the switching unit 14 determines whether or not switching from the first moving object as the switching source to the second moving object can be performed based on the operation data of the second moving object as the switching destination.

When the switching is not possible, the switching video generation unit 15 generates a switching video using the video acquired by the first moving body and the video acquired by the second moving body. After displaying the switching image on the screen, the switching unit 14 switches the control target from the first moving object to the second moving object.

In this way, even when the second moving object cannot be switched immediately, the operator control system with switching video generation unit 10*a* can switch the control target while reducing the uncomfortable feeling caused by the operator by displaying the switching image.

In addition, the operator control system with switching video generation unit 10*a* can take over the operation data of the first moving body to the second moving body while displaying the switching image, so that the same advantages as those of the first embodiment can be obtained.

Hardware Configuration Example

Each of the functional components of the operator control system 10 and the moving object 100 may be implemented by hardware (for example, a hardwired electronic circuit or the like) that implements each functional component, or may be implemented by a combination of hardware and software (for example, a combination of an electronic circuit and a program that controls the electronic circuit or the like). Hereinafter, a case where each functional component such as the operator control system 10 is realized by a combination of hardware and software will be described.

Figure 18:
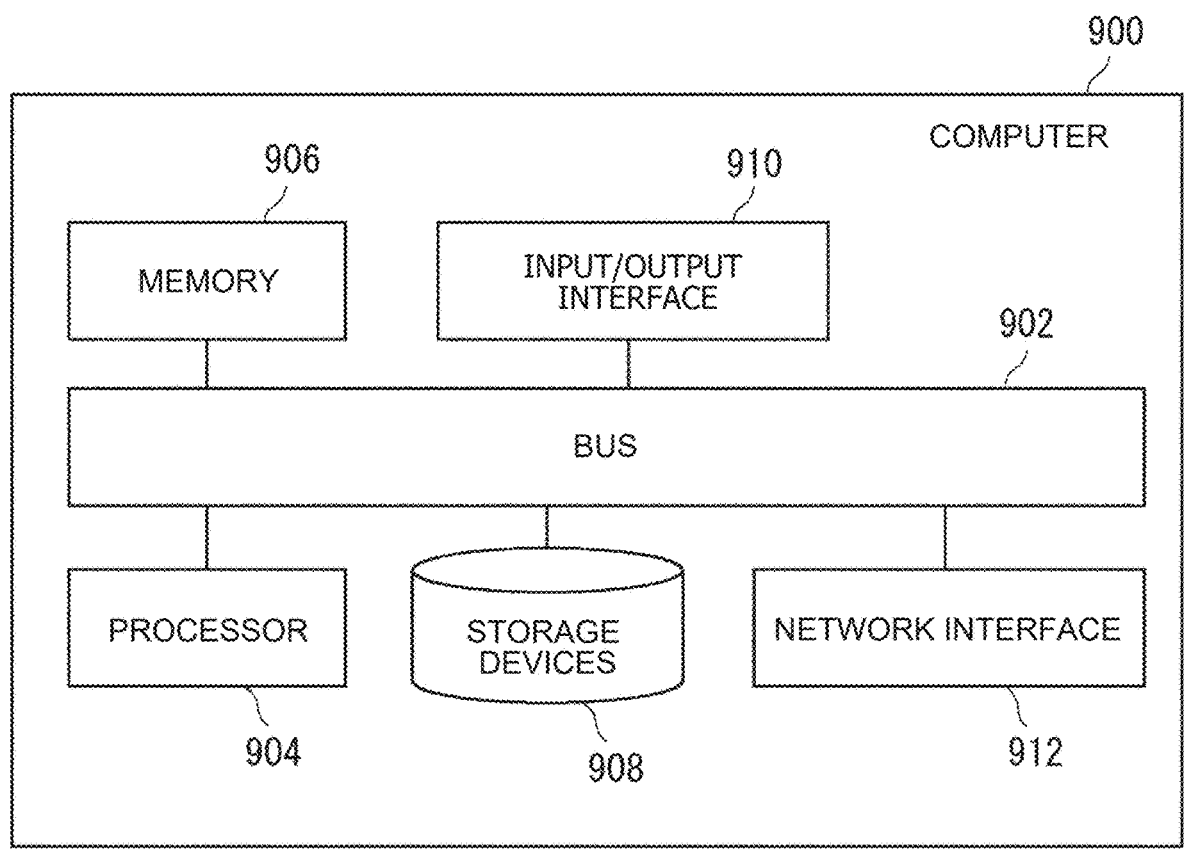

FIG. 18 is a block diagram illustrating a hardware configuration of a computer 900 that implements the operator control system 10 and the like. The computer 900 may be a dedicated computer designed to implement the operator control system 10 or the like, or may be a general-purpose computer. The computer 900 may be a portable computer such as a smartphone or a tablet terminal.

For example, by installing a predetermined application on the computer 900, each function of the operator control system 10 or the like is realized by the computer 900. The above-described application is constituted by a program for realizing functional components of the operator control system 10 and the like.

The computer 900 includes a bus 902, a processor 904, a memory 906, a storage device 908, an input/output interface 910, and a network interface 912. The bus 902 is a data transmission path through which the processor 904, the memory 906, the storage device 908, the input/output interface 910, and the network interface 912 transmit and receive data to and from each other. However, the method of connecting the processors 904 and the like to each other is not limited to the bus connection.

The processor 904 is a variety of processors, such as CPU (Central Processing Unit), GPU (Graphics Processing Unit), or FPGA (Field-Programmable Gate Array). The memory 906 is a main storage device realized by using RAM (Random Access Memory). The storage device 908 is an auxiliary storage device realized by using a hard disk, a SSD (Solid State Drive), a memory card, or a ROM (Read Only Memory).

The input/output interface 910 is an interface for connecting the computer 900 and the input/output device. For example, an input device such as a keyboard or an output device such as a display device is connected to the input/output interface 910.

The network interface 912 is an interface for connecting the computer 900 to a network. The networking may be LAN (Local Area Network) or WAN (Wide Area Network).

The storage device 908 stores a program (a program for realizing the above-described application) for realizing each functional component such as the operator control system 10. The processor 904 reads the program into the memory 906 and executes the program, thereby realizing the respective functional components of the operator control system 10 and the like.

Each of the processors executes one or more programs including instructions for causing a computer to perform an algorithm. The program includes instructions (or software code) that, when loaded into a computer, cause the computer to perform one or more of the functions described in the embodiments. The programs may be stored on various types of non-transitory computer-readable medium or tangible storage medium. Examples of the computer-readable medium or the tangible storage medium include, but are not limited to, a random-access memory (RAM), a read-only memory (ROM), a flash memory, a solid-state drive (SSD) or other memory technologies, a compact disc read-only memory (CD-ROM), a digital versatile disc (DVD), a Blu-ray (registered trademark) disc or other optical disc storages, a magnetic cassette, a magnetic tape, a magnetic disc storage, or other magnetic storage devices. The programs may be transmitted over various types of transitory computer-readable medium or communication media. Examples of the transitory computer-readable medium or the communication medium include, but is not limited to, an electrical, optical, acoustic, or other form of propagating signal.

The present disclosure is not limited to the above embodiments, and can be appropriately modified without departing from the spirit. For example, in the same manner as the operation information, the operator control system 10 may take over the environment information related to the environment of the switching source moving object 100 to the switching destination moving object 100. The environmental information may include, for example, the atmospheric pressure, water pressure, wind pressure, air temperature, or water temperature detected by the moving object 100 of the switching source.

Further, the above-described embodiments can be implemented in any combination. For example, some or all of the first embodiment, the first to third variations of the first embodiment, and the second embodiment may be executed in combination as appropriate.

What is claimed is:

1. An operation system for operating a moving object that is an operation target selected from a plurality of moving objects, the operation system comprising:
   a display unit for displaying display information including a video obtained by imaging an area around the moving object;
   a control interface configured to receive an operator input;
   a processor configured to generate a control signal based on the received operator input and to transmit the control signal to a drive mechanism of the moving object to perform physical movement,
   the processor is further configured to switch the operation target from a first moving object that is a switching source to a second moving object that is a switching destination, using movement information indicating movement of the moving object,
   wherein the switching of the operation target from the first moving object to the second moving object is implemented in at least one of following cases:
   i) after the second moving object starts moving based on movement information of the first moving object,
   ii) after the first moving object starts moving based on movement information of the second moving object, and
   iii) after the display unit displays a video adjusted in accordance with the movement information of the first moving object; and
   wherein the processor is configured to determine whether switching from the first moving object to the second moving object is able to be performed based on the movement information of the second moving object, and when the switching is not able to be performed, cause the display unit to display a switching video generated using a video obtained by imaging an area around the first moving object and a video obtained by imaging an area around the second moving object, and then switch the operation target from the first moving object to the second moving object.

2. The operation system according to claim 1, wherein:
   the display unit displays an icon for accepting a switching request of the operation target from an operator, in association with one of the plurality of moving objects that is a candidate of the switching destination;
   the icon is provided so as to be selectable in accordance with movement of the first moving object; and
   the processor is configured to switch the operation target to the one of the plurality of moving objects associated with the selected icon.

3. The operation system according to claim 2, wherein the processor is configured to estimate the icon to be selected, based on the movement information of the first moving object, and switches the operation target in accordance with an estimation result.

4. An operation method for an operation system configured to operate a moving object that is an operation target selected from a plurality of moving objects, the operation method comprising:
   a displaying step for displaying display information including a video obtained by imaging an area around the moving object,
   a receiving step of receiving an operator input;
   a generating step of generating a control signal based on the received operator input, wherein the control signal is used by a drive mechanism of the moving object to perform physical movement;
   a switching step for switching the operation target from a first moving object that is a switching source to a second moving object that is a switching destination, using movement information indicating movement of the moving object, wherein the switching step includes switching the operation target from the first moving object to the second moving object in at least one of following cases:
i) after the second moving object starts moving based on movement information of the first moving object,
ii) after the first moving object starts moving based on movement information of the second moving object, and
iii) after a video adjusted in accordance with the movement information of the first moving object is displayed in the displaying step, and wherein the switching step includes determining whether switching from the first moving object to the second moving object is able to be performed based on the movement information of the second moving object, and when the switching is not able to be performed, causing the display step to display a switching video generated using a video obtained by imaging an area around the first moving object and a video obtained by imaging an area around the second moving object, and then switching the operation target from the first moving object to the second moving object.

5. A non-transitory storage medium storing a program causing a computer of an operation system for operating a moving object that is an operation target selected from a plurality of moving objects to execute steps comprising:
 a displaying step for displaying display information including a video obtained by imaging an area around the moving object;
 a receiving step of receiving an operator input;
 a generating step of generating a control signal based on the received operator input, wherein the control signal is used by a drive mechanism of the moving object to perform physical movement;
 a switching step for switching the operation target from a first moving object that is a switching source to a second moving object that is a switching destination, using movement information indicating movement of the moving object, wherein the switching step includes switching the operation target from the first moving object to the second moving object in at least one of following cases:
i) after the second moving object starts moving based on movement information of the first moving object,
ii) after the first moving object starts moving based on movement information of the second moving object, and
iii) after a video adjusted in accordance with the movement information of the first moving object is displayed in the displaying step, and wherein the switching step includes determining whether switching from the first moving object to the second moving object is able to be performed based on the movement information of the second moving object, and when the switching is not able to be performed, causing the display step to display a switching video generated using a video obtained by imaging an area around the first moving object and a video obtained by imaging an area around the second moving object, and then switching the operation target from the first moving object to the second moving object.

* * * * *